US012478320B2

(12) United States Patent
Ogawa et al.

(10) Patent No.: US 12,478,320 B2
(45) Date of Patent: Nov. 25, 2025

(54) BREATHING SOUND MEASUREMENT DEVICE AND SLEEPING STATE MEASUREMENT SYSTEM

(71) Applicant: ONEA CO., LTD., Osaka (JP)

(72) Inventors: Fumio Ogawa, Osaka (JP); Teruya Kamura, Osaka (JP); Takuo Ohtuji, Osaka (JP); Masaru Ochi, Osaka (JP); Kenji Ohkoshi, Osaka (JP); Hiroyasu Kuzuhara, Osaka (JP); Hiroshi Hamada, Osaka (JP)

(73) Assignee: ONEA CO., LTD., Osaka (JP)

( * ) Notice: Subject to any disclaimer, the term of this patent is extended or adjusted under 35 U.S.C. 154(b) by 697 days.

(21) Appl. No.: 17/797,254

(22) PCT Filed: Feb. 3, 2021

(86) PCT No.: PCT/JP2021/003968
§ 371 (c)(1),
(2) Date: Aug. 3, 2022

(87) PCT Pub. No.: WO2021/157621
PCT Pub. Date: Aug. 12, 2021

(65) Prior Publication Data
US 2023/0056093 A1    Feb. 23, 2023

(30) Foreign Application Priority Data

Feb. 3, 2020 (JP) ................................. 2020-016209
Feb. 5, 2020 (JP) ................................. 2020-018074

(51) Int. Cl.
*A61B 5/00* (2006.01)
*A61B 5/08* (2006.01)
(Continued)

(52) U.S. Cl.
CPC .......... *A61B 5/4818* (2013.01); *A61B 5/0826* (2013.01); *A61B 5/4806* (2013.01);
(Continued)

(58) Field of Classification Search
None
See application file for complete search history.

(56) References Cited

U.S. PATENT DOCUMENTS

| 7,789,837 B2* | 9/2010 | Lehrman | A61B 5/0002 |
| | | | 600/537 |
| 2003/0163051 A1* | 8/2003 | Eckerle | A61B 5/6822 |
| | | | 600/485 |

(Continued)

FOREIGN PATENT DOCUMENTS

| JP | 2007-202939 A | 8/2007 |
| JP | 2019-51129 A | 4/2019 |

(Continued)

OTHER PUBLICATIONS

English machine translation of JP-2019201946-A. Retrieved May 3, 2025. (Year: 2025).*

(Continued)

*Primary Examiner* — Meredith Weare
(74) *Attorney, Agent, or Firm* — Maschoff Brennan

(57) ABSTRACT

A breathing sound measurement device includes a measurement section configured to be brought into contact with a skin of a front neck of a subject and measure breathing sound of the subject and a wearing section configured to have a first end connected to the measurement section and have elasticity to extend in a circular arc shape along an outer circumference of the subject's neck. The wearing section has a second end provided with a pressing portion configured to be pressed against a skin of a rear neck (Continued)

opposite a right front neck with respect to a midpoint between right and left halves of the subject's neck.

4 Claims, 24 Drawing Sheets

(51) Int. Cl.
    *A61B 7/00*       (2006.01)
    *A61F 5/56*       (2006.01)
    *H04R 1/14*       (2006.01)

(52) U.S. Cl.
    CPC ............ *A61B 5/6822* (2013.01); *A61B 5/743* (2013.01); *A61B 7/003* (2013.01); *A61F 5/56* (2013.01); *H04R 1/14* (2013.01)

(56) References Cited

U.S. PATENT DOCUMENTS

| | | | | |
|---|---|---|---|---|
| 2013/0144190 A1* | 6/2013 | Bruce | ................... | A61B 5/7282 |
| | | | | 600/586 |
| 2014/0350355 A1* | 11/2014 | Aisic | ..................... | A61B 7/003 |
| | | | | 600/301 |
| 2015/0010172 A1* | 1/2015 | Chen | ....................... | H04R 1/14 |
| | | | | 381/151 |
| 2017/0165101 A1* | 6/2017 | Davidian | ............... | A61H 23/02 |
| 2019/0141433 A1* | 5/2019 | Miyoshi | .................. | G10H 3/143 |
| 2020/0128317 A1* | 4/2020 | Feldman | ................. | H04R 1/083 |
| 2021/0250679 A1* | 8/2021 | Franzén | ................... | H04R 1/14 |

FOREIGN PATENT DOCUMENTS

| | | | |
|---|---|---|---|
| JP | 6565401 B2 | | 8/2019 |
| JP | 2019-150585 A | | 9/2019 |
| JP | 2019201946 A | * | 11/2019 |
| JP | 2019-217233 A | | 12/2019 |
| WO | 2017/221745 A1 | | 12/2017 |

OTHER PUBLICATIONS

JP Office Action dated Oct. 24, 2023 as received in Application No. 2020-016209.

* cited by examiner

FIG.9
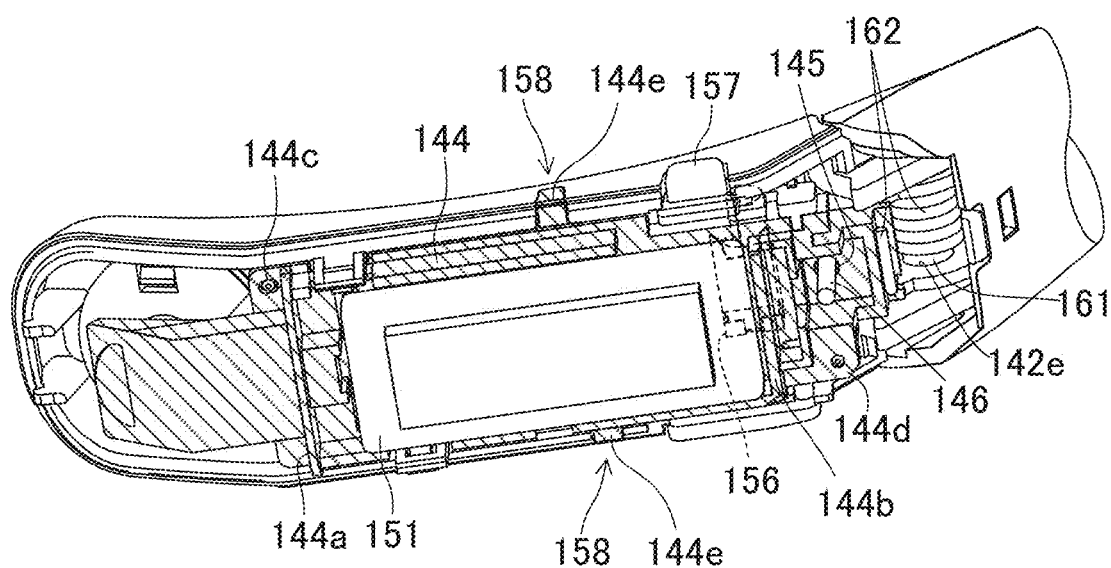
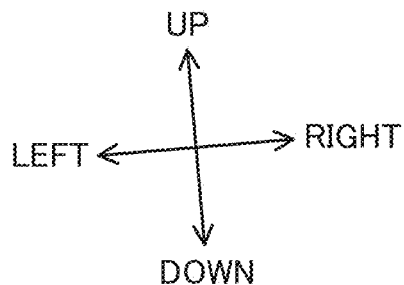

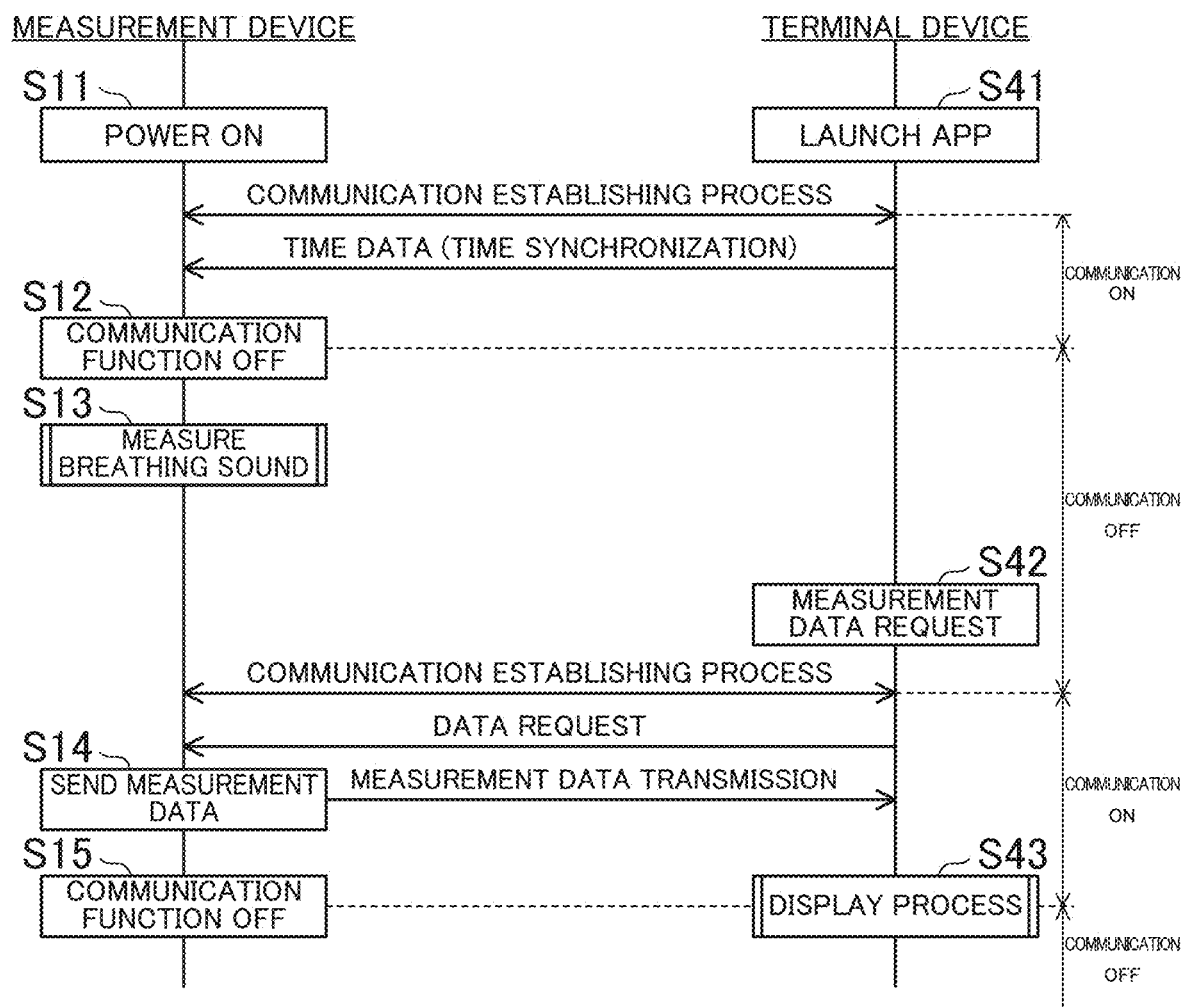

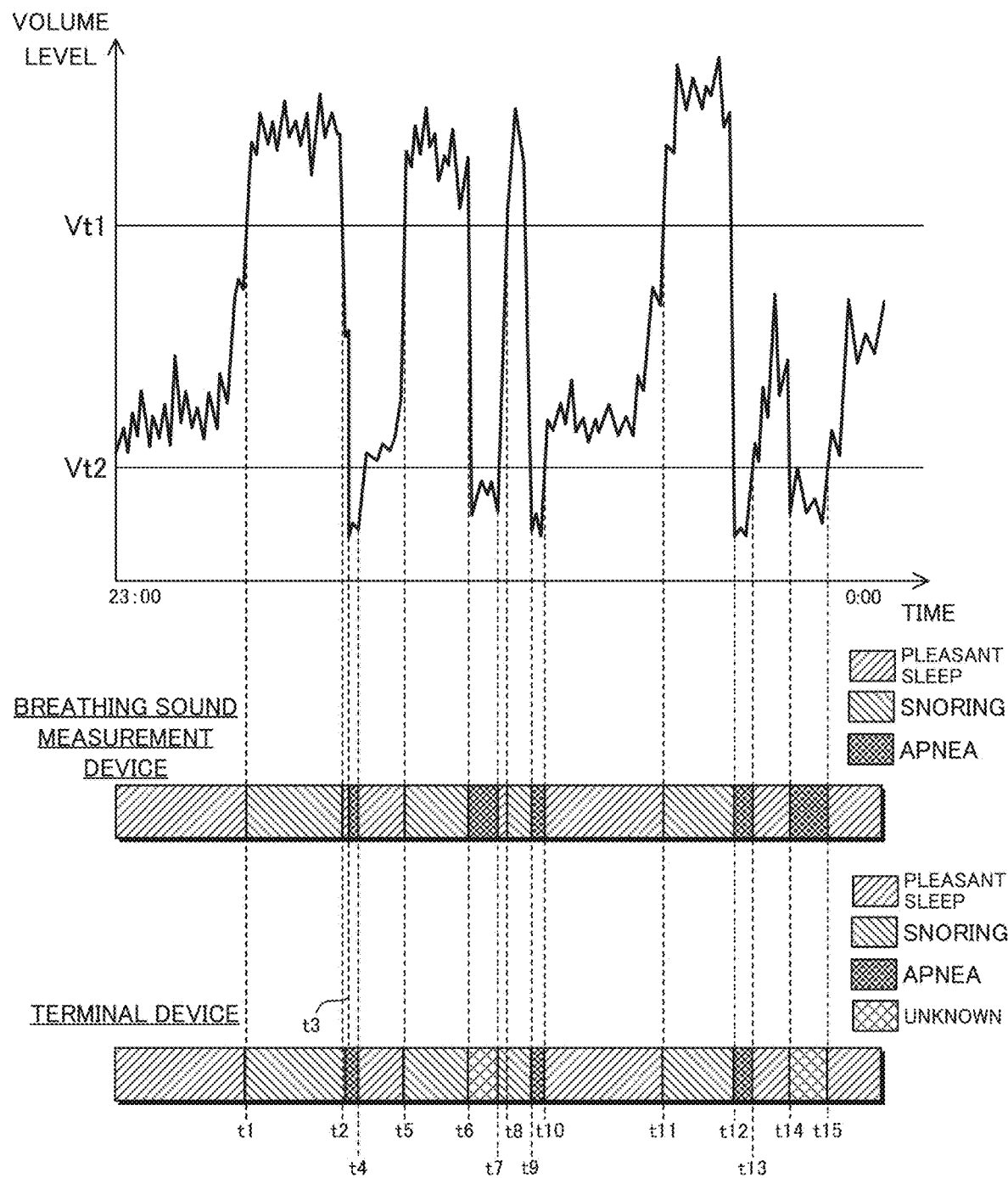

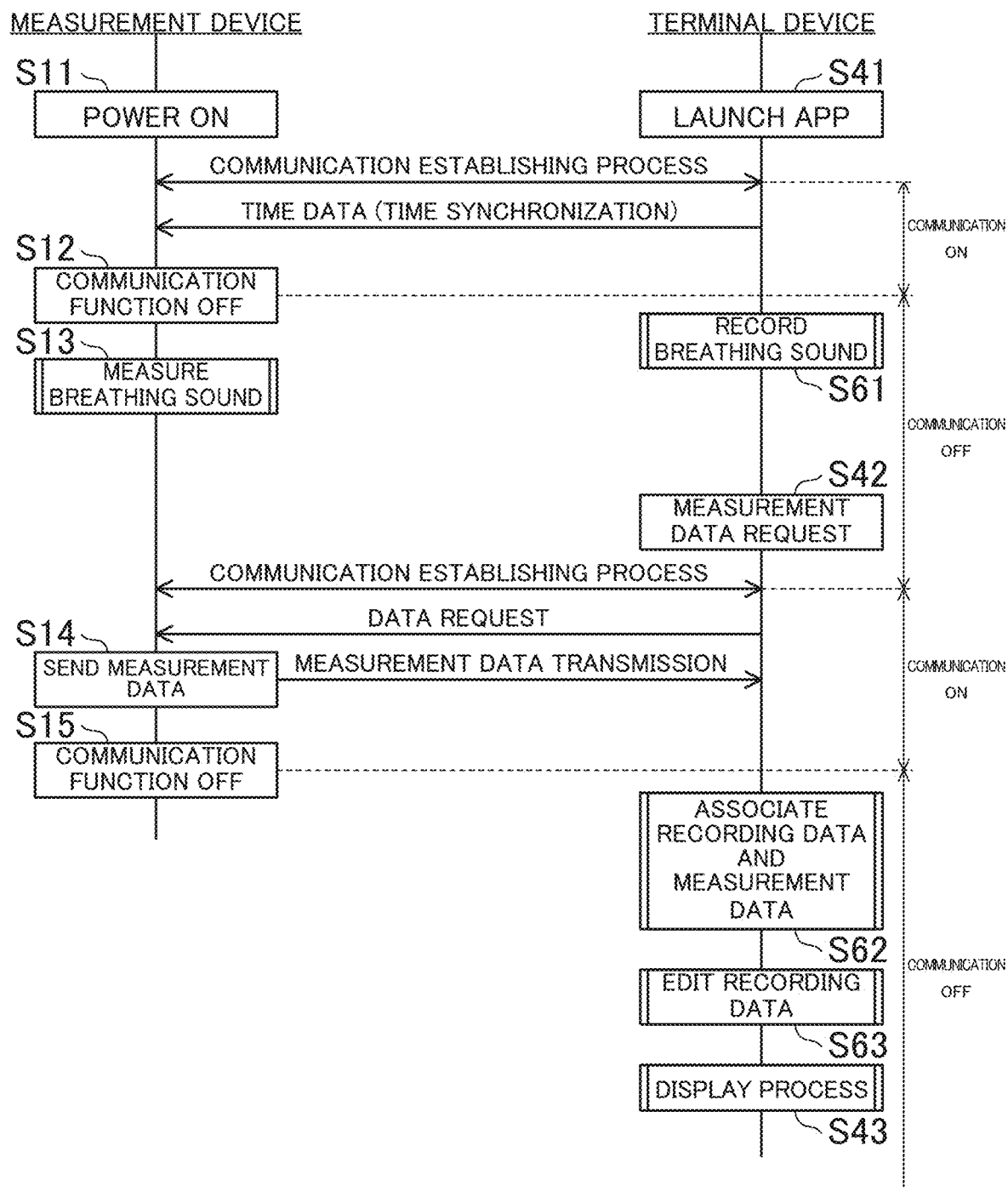

BREATHING SOUND MEASUREMENT DEVICE AND SLEEPING STATE MEASUREMENT SYSTEM

CROSS-REFERENCE TO RELATED APPLICATIONS

This application is a U.S. National Stage of PCT App. No. PCT/JP2021/003968, filed on Feb. 3, 2021, which claims priority to Japanese Patent Application No. JP2020-016209, filed on Feb. 3, 2020, and Japanese Patent Application No. JP2020-018074, filed on Feb. 5, 2020, all of which are incorporated herein by reference in their entirety.

TECHNICAL FIELD

The present invention relates to a neckband-type breathing sound measurement device and a sleeping state measurement system configured to measure a sleeping state of a subject.

BACKGROUND ART

Snoring during sleep may annoy others, or snoring may develop into an apneic state, which may then lead to obstructive apnea syndrome. Given these circumstances, there has been demand for a measurement device configured to measure snoring and sleep apnea.

PTL 1 discloses a method for recording sound received by a microphone during a patient's sleep with the microphone attached around the patient's neck.

PTL 2 discloses a sleep snoring analysis device configured to determine the trend of snoring of a wearer on the basis of the intensity of a wave of a predetermined frequency band of acceleration measured during the wearer's sleep and calculate, on the basis of the trend of snoring, a risk of developing sleep apnea syndrome.

CITATION LIST

Patent Literature

PTL 1: Japanese Unexamined Patent Application Publication No. 2007-202939
PTL 2: Japanese Patent No. 6565401

SUMMARY OF INVENTION

Technical Problem

From the point of view of increasing the accuracy of measurement of breathing sound, it is desirable that a neckband-type breathing sound measurement device acquire breathing sound directly from the airway at a subject's neck. Further, it is desirable that a neckband-type breathing sound measurement device apply a moderate contact pressure in acquiring breathing sound directly from the airway of a subject. Accordingly, a C-shaped neckband having both ends extended to both anterolateral sides of a subject has conventionally been used as in the case of PTL 1. However, some subjects may feel a great unpleasantness resulting from wearing a neckband-shaped breathing sound measurement device of such a configuration.

For example, while typical males measure approximately 36 to 47 cm around the neck, some males measure more or less than the typical range. Accordingly, there has been provided a lineup of neckbands of multiple sizes (e.g. S, M, L, or other sizes). However, even among those subjects who use neckbands of the same size, there are variations in the shape of the necks and in the measurement of the neck circumference, and it is undesirably difficult to accurately adjust the sizes of ready-made neckbands separately to each subject. In particular, during sleep, a subject may feel an unpleasantness that interferes with comfortable sleep. Further, a subject may lie sideways during sleep, and when one side of the subject's neck is pressed against the bedding, the other side rises, which may then interferes with accurate measurement.

The technology of PTL 2 ends up only displaying, on the basis of the trend of snoring, a risk of developing sleep apnea syndrome, and has room for improvement.

That is, the present disclosure was made in view of these circumstances, and has as an object to provide a neckband-type breathing sound measurement device configured to suitably acquire breathing sound from a subject's neck while alleviating an unpleasantness that the subject feels while wearing the neckband-type breathing sound measurement device. Further, the present disclosure has as an object to provide a sleeping state measurement system configured to perform a display that makes it easy for a subject to more specifically grasp his/her sleeping state.

Solution to Problem

A breathing sound measurement device according to an aspect of the present invention includes a measurement section configured to be brought into contact with a skin of a front neck of a subject and measure breathing sound of the subject and a wearing section configured to have a first end connected to the measurement section and have elasticity to extend in a circular arc shape along an outer circumference of the subject's neck. The wearing section has a second end provided with a pressing portion configured to be pressed against a skin of a rear neck opposite the front neck with respect to a midpoint between right and left halves of the subject's neck.

According to the present aspect, the measurement section is brought into contact with the front portion of the subject's neck, i.e. the throat, so that breathing sound can be suitably acquired from the subject's neck. Meanwhile, the second end of the wearing section is pressed against the skin of the rear neck opposite the front neck. That is, the second end of the wearing section is not extended to the front of the subject. This makes it possible to alleviate the subject's feeling of having his/her neck squeezed. This also makes it possible to bring about a state where the wearing section is not sandwiched between the bedding and the subject in a case where the subject lies sideways. This makes it possible to prevent the measurement section from being detached from the subject neck by the wearing section being pushed by the bedding. This also makes it possible to make it hard for the wearing section to rub against the bedding or other bedclothes.

In the breathing sound measurement device according to the foregoing aspect, the measurement section and the wearing section may be coupled to each other via a hinge section configured to support the measurement section and the wearing section so that the measurement section and the wearing section are rotatable between an expanded position in which the measurement section and the wearing section are expanded so that the breathing sound measurement device assumes a circular arc shape and a folded position in which the measurement section is folded inward toward the wearing section and bias the measurement section and the wearing section into the folded position.

This makes it possible to better make adjustments to attain suitable contact pressures separately for each of subjects differing in size of the neck than in a case where a conventional hingeless neckband is used, making it possible to minimize an unpleasantness resulting from wearing.

A sleeping state measurement system according to an aspect of the present invention includes the breathing sound measurement device according to the foregoing aspect and a terminal device having communication means configured to communicate with the breathing sound measurement device and display means. The terminal device receives a measurement result from the breathing sound measurement device and displays information on the subject's snoring period, normal breathing period, and apneic period in at least either graph or numerical form on the display means on the basis of the measurement result thus received.

According to the present aspect, the information on the subject's snoring period, normal breathing period, and apneic period are displayed in at least either graph or numerical form on the terminal device. This display allows the subject to more specifically grasp his/her sleeping state. Specifically, by grasping periods of different sleeping states, the subject can find a correlation between an internal factor such as his/her physical condition or an external factor such as the surrounding environment and the sleeping state. This makes it easy for the subject to mull over effective measures to improve the sleeping state.

In the sleeping state measurement system according to the foregoing aspect, the breathing sound measurement device includes a vibrator configured to impart vibration to the subject, and the terminal device displays, on the display means, a juxtaposition of first sleep information including information on the subject's snoring period, normal breathing period, and apneic period in a vibration mode in which the vibrator is caused to vibrate and second sleep information including information on the subject's snoring period, normal breathing period, and apneic period in a non-vibration mode in which the vibrator is prohibited from vibrating.

Taking such a form of display allows the subject to easily compare a sleeping state in the vibration mode and a sleeping state in the non-vibration mode. This also makes it possible to objectively grasp effects brought about by using the vibration mode.

In the sleeping state measurement system according to the foregoing aspect, the breathing sound measurement device or the terminal device may include computing means configured to compute the subject's snoring period, normal breathing period, and apneic period on the basis of a volume level of breathing sound measured by the breathing sound measurement device, in a case where a period of time during which the volume level of the breathing sound is lower than a predetermined threshold is shorter than a predetermined period of time, the computing means may determine the period of time as the subject's apneic period, and in a case where the period of time during which the volume level of the breathing sound is lower than the predetermined threshold has continued for the predetermined period of time or longer, the computing means may not determine the period of time as an apneic period.

Such a configuration makes it possible to eliminate, from an apneic period, the result of a measurement carried out in a case where the device is unintendedly detached for a relatively long period of time. This makes it possible to prevent deterioration in accuracy of measurement during an apneic period.

In the sleeping state measurement system according to the foregoing aspect, at least either the breathing sound measurement device or the terminal device may include recording means configured to record breathing sound of the subject during sleep, the computing means may determine, as the snoring period, a period of time during which a volume level of breathing sound measured by the breathing sound measurement device is higher than or equal to a predetermined threshold, and cuts out recording data representing the snoring period, and the recording data thus cut out may be saved in the terminal device.

Including such a recording function makes it possible to grasp specifically how the subject snores. Further, cutting out the data representing the snoring period makes it possible to save a storage area that is used for recording.

In the sleeping state measurement system according to the foregoing aspect, the breathing sound measurement device may include a vibrator configured to impart vibration to the subject's neck, and the vibrator may be configured to vibrate during at least either the subject's snoring period or apneic period and be configured to be set into a vibration stop mode in which to stop vibration for a predetermined period of time after a start of a measurement of a sleeping state of the subject.

This makes it possible to prevent the vibrator from vibrating within a relatively short period of time after the onset of sleep to keep the subject from falling asleep.

Advantageous Effects of Invention

The breathing sound measurement device of the present disclosure makes it possible to suitably acquire breathing sound from a subject's neck while alleviating an unpleasantness that the subject feels while wearing the neckband-type breathing sound measurement device. The sleeping state measurement system of the present disclosure makes it possible to perform a display that makes it easy for a subject to more specifically grasp his/her sleeping state.

BRIEF DESCRIPTION OF DRAWINGS

FIG. 9 is a side view of the breathing sound measurement device as seen from diagonally right below with an outer case removed therefrom.

FIG. 14 is a flow chart showing an example of an operation of a sleeping state measurement system.

FIG. 17 is a waveform chart showing an example of a measurement result yielded by the breathing sound measurement device.

FIG. 19 is a flow chart showing another example of an operation of the sleeping state measurement system.

DESCRIPTION OF EMBODIMENTS

The following describes embodiments of the present invention in detail with reference to the drawings. The following description of preferred embodiments is essentially a mere illustration, and is not intended at all to limit the present invention, that to which it is applied, or the purpose for which it is used.

First Embodiment

<Configuration of Breathing Sound Measurement Device>

Figure 1:
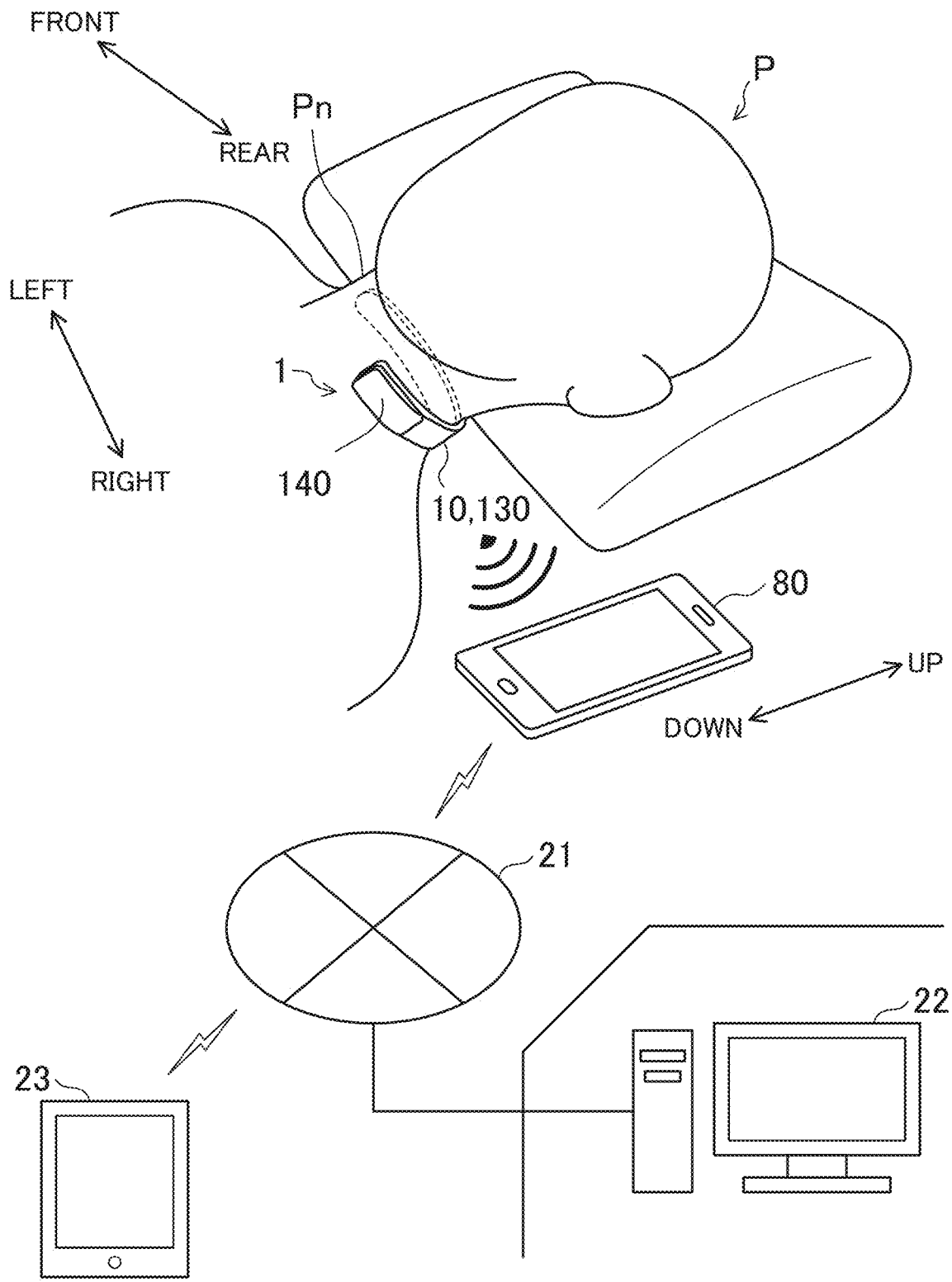
FIG. 1 is a schematic view showing a state of wearing of a breathing sound measurement device.
Figure 8A:
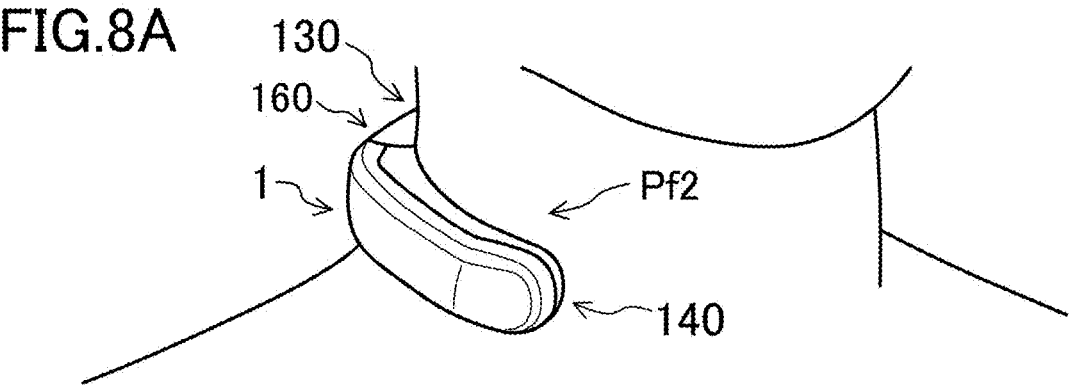
FIG. 8A is a diagram of photographs of a state of wearing of the breathing sound measurement device.
Figure 8B:
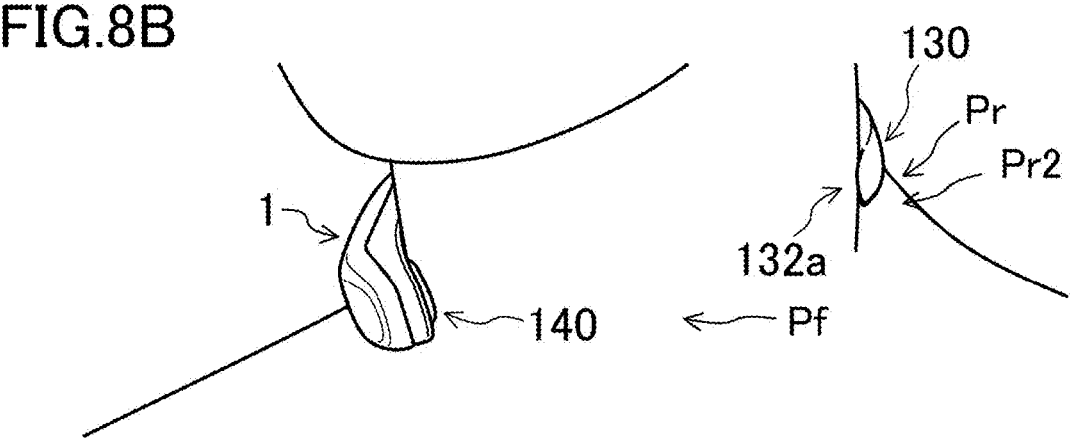
FIG. 8B is a diagram of photographs of a state of wearing of the breathing sound measurement device.
Figure 8C:
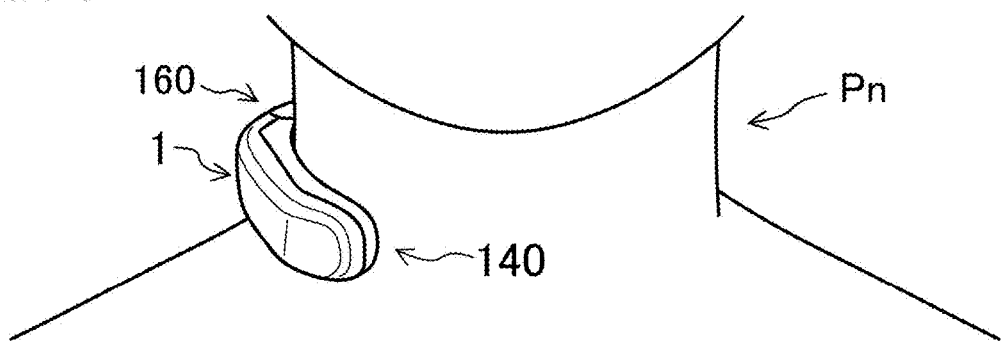
FIG. 8C is a diagram of photographs of a state of wearing of the breathing sound measurement device.

As shown in FIGS. 1 and 8, a breathing sound measurement device 1 is worn by a subject P on the subject's neck Pn (hereinafter referred to simply as "neck Pn") before bedtime to measure the airflow sound of inhalation and exhalation during sleep (hereinafter referred to simply as "breathing sound"). Specifically, the breathing sound measurement device 1 is a neckband-shaped device configured to be wearable circumferentially on the subject's neck. The breathing sound measurement device 1 is an example of a sleeping state measurement device configured to measure a sleeping state of the subject P. Whereas the breathing sound measurement device 1 is worn on the left in FIG. 1, the breathing sound measurement device 1 is worn on the right in FIG. 8. In this way, the breathing sound measurement device 1 may be worn on either the left or right of the neck Pn.

Figure 3:
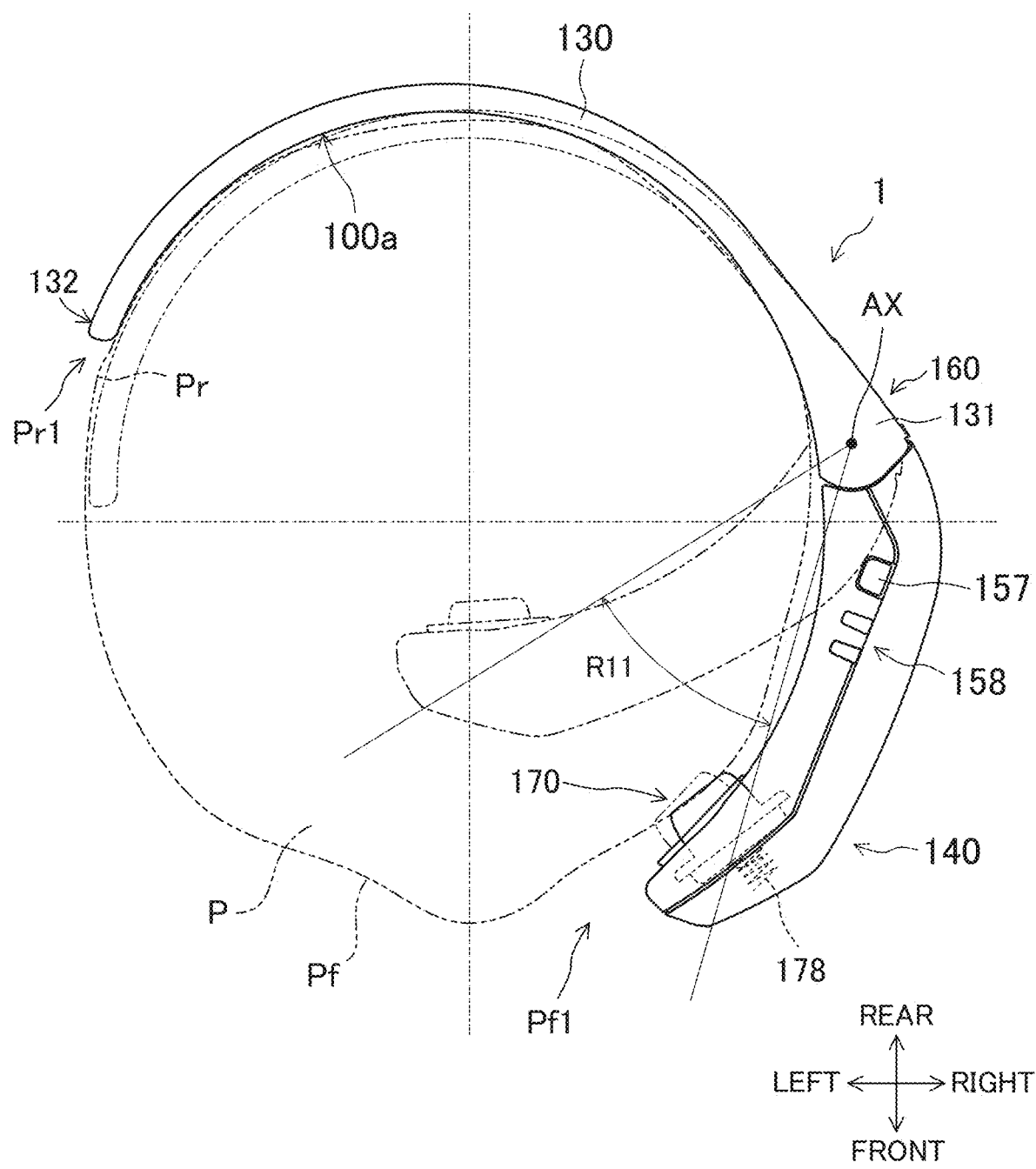
FIG. 3 is a plan view of the breathing sound measurement device as seen from above.

Specifically, as shown in FIG. 3, the breathing sound measurement device 1 has a configuration in which a neckband-shaped wearing section 130 formed in an circular arc shape (e.g. a semicircular shape) and a measurement section 140 configured to measure breathing sound are coupled to each other by a hinge section 160 of a well-known structure. The breathing sound measurement device 1 is configured such that an angle of opening θ between both open ends in an expanded state as seen from the center of the device is larger than 90 degrees. In other words, the breathing sound measurement device 1 is configured such that the outer shape of the device in an expanded state (see FIG. 5) is less than 270 degrees with respect to a virtual circle extending circumferentially along the outer shape. In FIG. 3, AX denotes an axis of rotation.

In a description of the first embodiment, upward and downward directions and rightward and leftward directions are defined on the basis of a state of wearing of the breathing sound measurement device 1 by the subject P. Further, the front part (chest) of the subject is defined as "front", and the back part of the subject P is defined as "rear". Further, the "subject's side" is defined on the basis of a state of wearing of the breathing sound measurement device 1, and a description of the wearing section 130, the measurement section 140, or other components may be given with the subject's side being "inner side" and the opposite side being "outer side". Further, a surface of the breathing sound measurement device 1 that faces the subject's neck Pn is called "inner surface 100a of the breathing sound measurement device 1", or simply "inner surface 100a". That is, the "inner surface 100a of the breathing sound measurement device 1" is a concept that encompasses an inner surface 142c of the measurement section 140 in addition to an inner surface of the wearing section 130.

<<Wearing Section>>

As shown in FIG. 3, the wearing section 130 extends in a circular arc shape along the outer circumference of the subject's neck Pn (hereinafter also referred to simply as "neck Pn"). A first end 131 (hereinafter referred to as "base end 131") of the wearing section 130 is connected to the measurement section 140 via the hinge section 160. A leading end of the measurement section 140 constitutes one open end of the breathing sound measurement device 1. A second end 132 (hereinafter referred to as "pressing portion 132") of the wearing section 130 constitutes the other open end of the breathing sound measurement device 1. That is, the pressing portion 132 is constituted integrally with the wearing section 130, and is pressed against the subject when the breathing sound measurement device 1 is worn on the neck Pn.

The wearing section 130 is configured such that in a case where the after-mentioned contact section 170 is brought into contact with the skin of a right front neck Pf1 of the subject P in a state of wearing by the subject P as shown in FIG. 3, the pressing portion 132 is pressed against a left rear neck Pr1 of the subject P. Meanwhile, the wearing section 130 is configured such that in a case where the after-mentioned contact section 170 is brought into contact with the skin of a left front neck Pf2 of the subject P in a state of wearing by the subject P as shown in FIG. 8, the pressing portion 132 is pressed against a right rear neck Pr2 of the subject P. In other words, the measurement section 140 and the pressing portion 132 are placed asymmetrically with respect to a midpoint between the right and left halves of the neck Pn. The midpoint between the right and left halves is defined, for example, by the middle position of the "Adam's apple" as seen from the front of the subject P.

Note here that the term "front neck Pf" refers to a surface of the circumference of the neck Pn of the subject P that is further forward than a virtual plane passing through the respective centers of the ears of the subject P or that is further forward than a midpoint between the front and rear halves of the neck Pn. In particular, it is preferable that a position of contact of the contact section 70 be the skin of a near-tracheal area (e.g. the throat) at the front neck Pf, and the position of contact of the contact section 70 can be set to be a position at the front neck Pf that is forward. Note also that the term "rear neck Pr" refers to a surface of the circumference of the neck Pn of the subject P that is further backward than a virtual plane passing through the respective centers of the ears of the subject P or that is further backward than a midpoint between the front and rear halves of the neck Pn. The pressing portion 132 is pressed against the skin of the rear neck Pr. That is, the pressing portion 132 is pressed against the skin of an area that is further backward than an ear of the subject P. This allows the breathing sound measurement device 1 of the present embodiment to better alleviate a feeling of unpleasantness (e.g. a feeling of being squeezed) for the subject P than a conventional configuration disclosed in PTL 1 (in which a breathing sound measurement device is configured in a C shape so that both open ends are placed further forward than the ears, respectively, of the subject P and in which the open ends are pressed against the skin of the subject P in front of the ears). This can also make it harder to inhibit passage of blood than in the case of pressing on both ears, as major blood vessels run upward and downward through areas at the neck inside the ears. From such a point of view too, the feeling of unpleasantness (e.g. the feeling of being squeezed) for the subject P is alleviated.

It is preferable (1) that the wearing section 130 can be worn on an area from behind the neck Pn toward the neck Pn by the subject P moving both open ends of the breathing sound measurement device 1 far apart to either side with both hands, (2) that the wearing section 130 have the elasticity to hold the neck Pn circumferentially from outside so that when the subject P loosens his/her hold of the wearing section 130, at least part of the inner surface 100a of the breathing sound measurement device 1 comes into close contact with the neck Pn, and (3) that the wearing section 130 have the strength to withstand continuing use. The wearing section 130 is not limited to particular specific structures or constituent materials, provided it satisfies the aforementioned conditions (1) to (3). Employable examples of the wearing section 130 include an elastic structure including a plate spring and an elastomer resin wound around the plate spring and an elastic polypropylene resin. Note, however, that the technology of the present disclosure is not limited to employing a plate spring structure or using an elastomer resin or polypropylene resin as the wearing section 130.

<<Hinge Section>>

The hinge section 160 supports the wearing section 130 and the measurement section 140 so that the wearing section 130 and the measurement section 140 are rotatable between an expanded position indicated by solid lines in FIG. 3 and a folded position indicated by virtual lines in FIG. 3.

The expanded position is a position in which the measurement section 140 is opened maximally outward and, at a junction between the wearing section 130 and the measurement section 140, the inner surface 100a is substantially flat. That is, in a case where the measurement section 140 is in the expanded position, the breathing sound measurement device 1 is in a circular arc configuration as a whole. In the expanded position, for example, a leading end of the wearing section 130 and a base end of the measurement section 140 are brought into contact with each other, and are locked so that an angle between the wearing section 130 and the measurement section 140 does not spread further outward.

Figure 2:
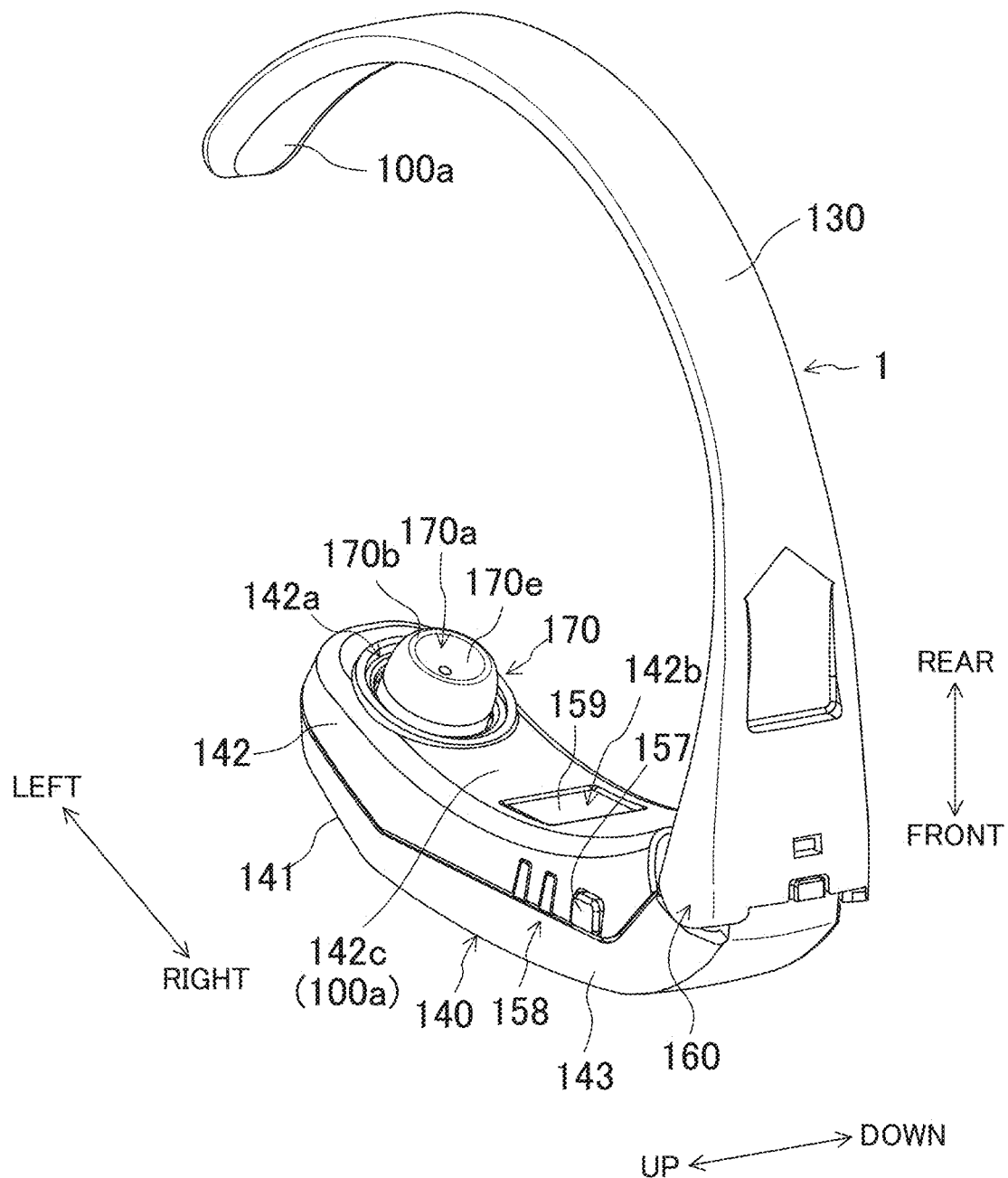
FIG. 2 is a perspective view of the breathing sound measurement device as seen from diagonally right above.

The folded position is a position in which the measurement section 140 is folded inward toward the wearing section 130 (see FIG. 2). In the folded position, for example, the base end of the measurement section 140 is brought into contact with an outside inner wall of the wearing section 130, and is locked so as not bend further inward.

An example of a range of movement R11 between the expanded position and the folded position is, but is not limited to, approximately 40 degrees. A range of movement of approximately 40 degrees can encompass a horizontally-challenged subject P. Note, however, that the range of movement (range of rotation) is not limited to approximately 40 degrees, and for example, the range of movement may be smaller than 40 degrees or larger than 40 degrees. How much the breathing sound measurement device 1 opens varies depending on rotation between the expanded position and the folded position.

Figure 6:
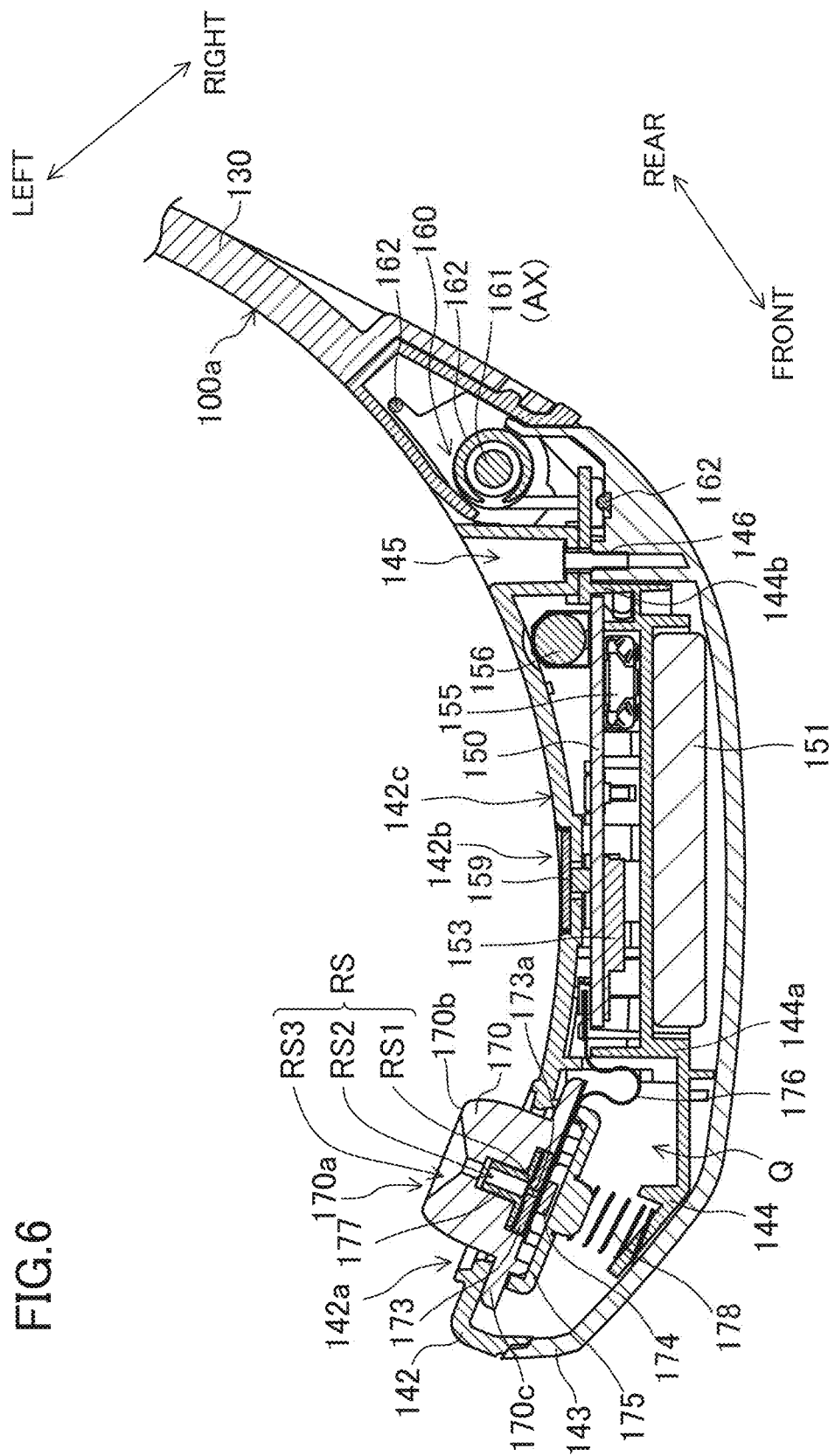
FIG. 6 is an enlarged view of a measurement section and an area therearound in FIG. 5.

As shown in FIG. 6, the hinge section 160 includes a rotating shaft portion 161 constituting the axis of rotation AX, which serves as a central axis of the aforementioned rotation, and biasing means 162 configured to bias the measurement section 140 into the folded position.

The rotating shaft portion 161 is not limited to particular configurations. However, for example, as mentioned above, the rotating shaft portion 161 can be achieved by providing bearings at base ends of both side walls of an inner case 142 and rotatably supporting the rotating shaft portion 161 in the bearings.

The biasing means 162 is not limited to particular configurations. However, in the example shown here, a torsion coil spring is used. The biasing means 162 has one end fixed to a housing case 141 with the other end fixed to the wearing section 130. Although not illustrated, the hinge section 160 may be a so-called a hinge spring constituted by integrating a hinge and a spring with each other. In this case too, the hinge spring is fixed to the housing case 141 and the wearing section 130.

Figure 5:
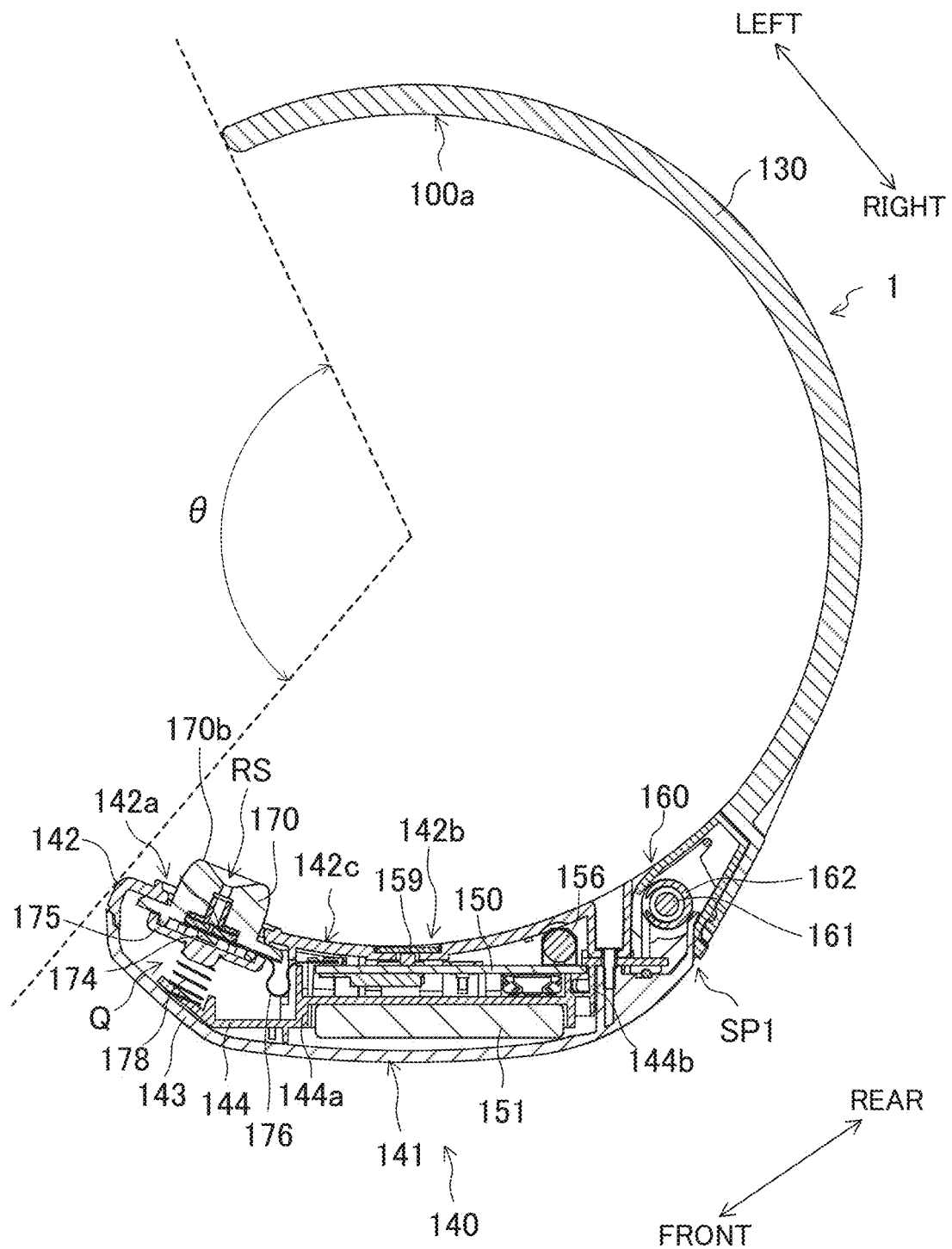
FIG. 5 is a cross-sectional view taken along line V-V in FIG. 4.

Note here that the biasing means 162 is configured such that a biasing force of the biasing means 162 is greater than a biasing force of a compression coil spring 178. Such a configuration makes it possible to suitably achieve an operation of (1) performing rough alignment according to the body shape (in particular, the neck size) of a subject by the action of the biasing means 162 and (2) adjusting the angle of a contact surface 170b of the contact section 70 along a place of measurement (skin surface) of breathing sound of the subject's neck Pn by the action of the compression coil spring 178. In this operation, a partition wall 144b may be provided in a housing space Q at the base end of the measurement section 140 in order to prevent entry of extraneous matter from around the hinge section 160. Providing the partition wall 144b beside the housing space Q in this way makes it possible to bring about a dust preventive effect while enhancing the movability of the hinge section 160. Alternatively, as shown in FIG. 5, a partition wall 144 constituted by integrating the after-mentioned partition wall 144a and the partition wall 144b with each other may be provided. Such a configuration makes it possible to reduce constituent members and enhance assembling workability. In FIG. 9, the partition wall 144 is shaded with diagonal strokes from left to bottom right.

<<Measurement Section>>

—Housing Case—

As shown in FIGS. 5 and 6, the measurement section 140 has a housing case 141 having a housing space Q formed inside by fitting together an inner case 142 and an outer case 143.

The inner case 142 includes a bottom plate formed in a round shape so as to project outward and side plates standing up outward from upper and lower ends and a leading end of the bottom plate so as to surround the housing space Q. The bottom plate of the inner case 142 has a first opening 142a formed in a circular shape in a substantially middle position between upper and lower halves at the leading end and a second opening 142b formed in a rectangular shape in a substantially middle position in a circumferential direction and between upper and lower halves.

Through the first opening 142a, the contact section 170 is inserted from inside the housing case 141. Moreover, the contact section 170 is retained in the housing case 141 by a flange portion 170c (see FIG. 6) formed at a base end of the contact section 170. The second opening 142b is used, for example, as a measuring window through which to pass measuring light in the case of using an optical human detection sensor 159 in order to detect whether the breathing sound measurement device 1 has been worn on the neck Pn. It should be noted that the second opening 142b is not always necessary, and is unnecessary, for example, in a case the human detection sensor 159 is not optical or the human detection sensor 159 is not provided at all.

As shown in FIG. 9, at base ends of both side walls of the inner case 142 (base ends beside the wearing section 130), bearings 142e configured to rotatably support the rotating shaft portion 161 of the after-mentioned hinge section 160 are provided, respectively. The bearings 142e are not limited to particular configurations. However, for example, at the base ends of both side walls of the inner case 142, shaft insertion holes that are slightly larger than the outer shape of the rotating shaft portion 161 are formed.

Figure 4:
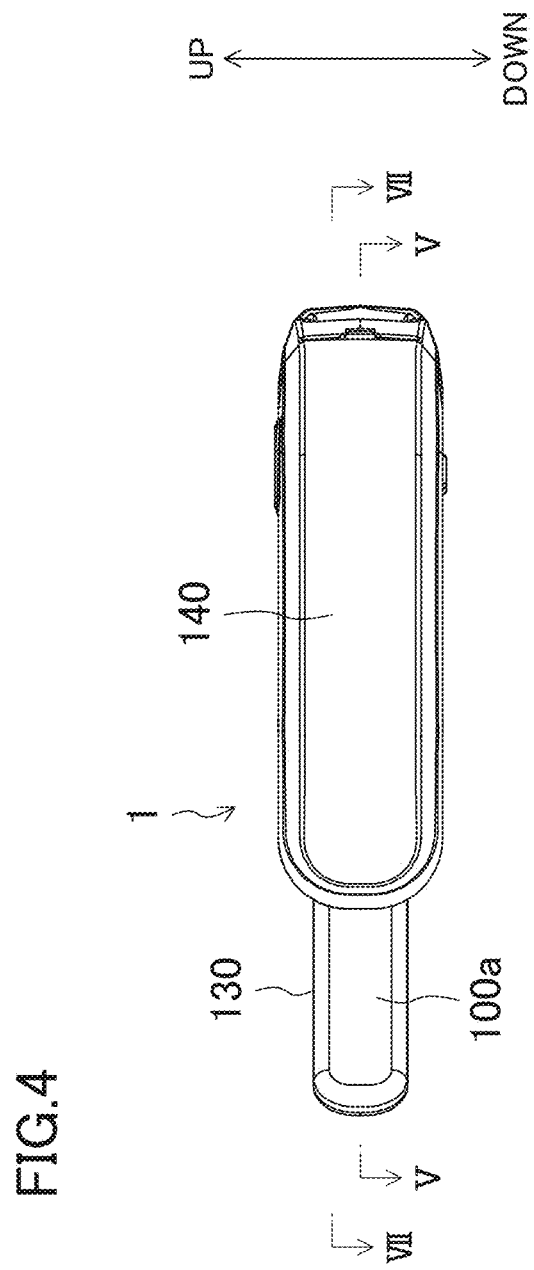
FIG. 4 is a side view of the breathing sound measurement device as seen from diagonally right front.

As shown in FIGS. 2 to 4, the outer case 143 of the housing case 141 includes an upper plate placed opposite the bottom plate of the inner case 142 and side plates standing up inward from upper and lower ends and a leading end of the upper plate so as to surround the aforementioned housing space Q. The upper plate of the outer case 143 has a base end formed so as to cover a portion of the hinge section. After the inner case 142 and the outer case 143 have been aligned, the housing case 141 is fixedly screwed by a screw 146 (see FIG. 6) inserted in a screw hole 145 (see FIG. 6) formed in the bottom plate of the inner case 142.

As shown in FIG. 6, the housing space Q of the housing case 141 houses a first substrate 173 to which a microphone 174 is attached, a second substrate 150 mounted with electronic components or other components configured to process breathing sound acquired by the microphone 174, and a battery 151 configured to supply power to each constituent element of the breathing sound measurement device 1. The first substrate 173 and the second substrate 150 are connected to each other via a flexible cable 176. It should be noted that the housing case 141 may be formed of a material that is the same as or different from that of which the wearing section 130 is formed.

Although not illustrated, the measurement section 140 has a side plate provided with an insertion slot opening outward, and via the insertion slot, a communication/charging cable can be plugged into a connector 155.

—Contact Section—

Figure 7:
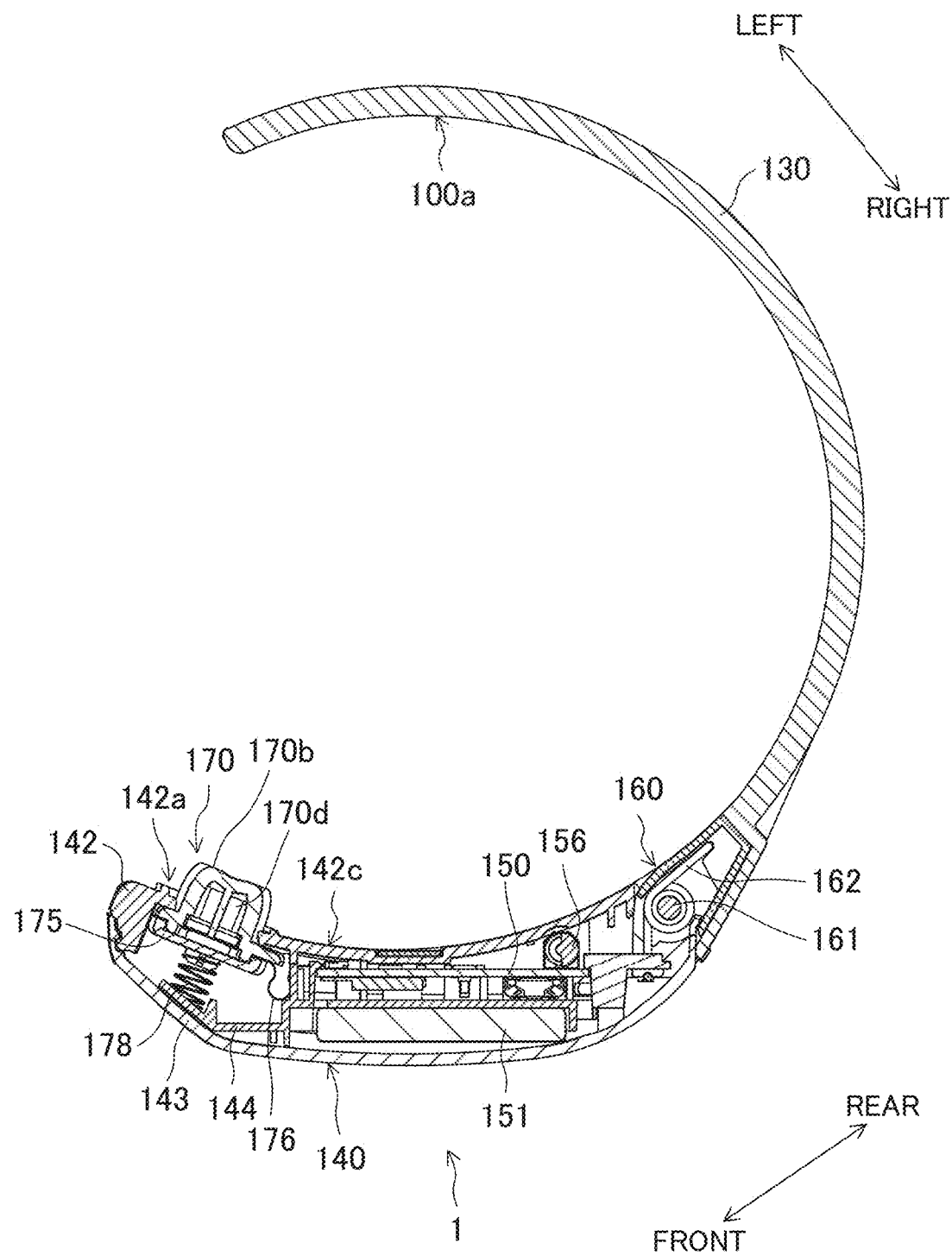
FIG. 7 is a cross-sectional view taken along line VII-VII in FIG. 4.

As shown in FIGS. 2 and 6, the breathing sound measurement device 1 includes a contact section 170 provided in such a manner as to project inward (i.e. toward the neck Pn of the subject P) from the inner surface 142c of the inner case 142. The contact section 170 has a sound inlet 170a, formed at a leading end thereof, through which to introduce breathing sound of the subject and a contact surface 170b formed in such a ring shape as to surround the sound inlet 170a. The contact surface 170b comes into contact with the neck Pn when the breathing sound measurement device 1 has been worn. Providing the contact section 170 with the contact surface 170b in this way makes it possible to widen the area of contact with the neck Pn, prevents breathing sound from leaking out, and makes it possible to enhance a sound-collecting effect. Alternatively, it is also possible to provide a hollow space 170d (see FIG. 7) inside the contact section 170 to attain a lighter weight while maintaining strength.

As shown in FIG. 6, the contact section 70 has a base end face, depressed in a substantially rectangular shape in the center, in which the rectangular first substrate 173 is fitted. Moreover, the microphone 174 is attached to substantially the center of an inner surface of the first substrate 173.

The concept "microphone" as used in the present disclosure widely encompasses a device or circuit configured to convert sound waves into electrical signals, a sound sensor, such as a MEMS microphone, that is used in such equipment, or other devices, and is not limited to particular specific configurations. Meanwhile, for convenience of explanation, the present embodiment uses the term "microphone" to refer to a sound sensor, such as a MEMS microphone, configured to acquire breathing sound. Note, however, that this is intended for convenience of explanation, and is not intended to limit the meaning of the term "microphone".

The contact section 170 may be constituted by any material that has sufficient hardness (predetermined hardness) to maintain the after-mentioned second sound guide space RS2 in the shape of a cylinder. For example, the contact section 170 may be constituted by a material such as plastic resin (e.g. polyoxymethylene). Alternatively, for example, polypropylene or silicone resin having a hardness higher than or equal to 50 may be used.

As shown in FIG. 6, the contact section 170 is provided with a sound guide space RS through which to guide, toward the microphone 174, the breathing sound introduced through the sound inlet 170a. The sound guide space RS is constituted by a first sound guide space RS1, a second sound guide space RS2, and a third sound guide space RS3. The first sound guide space RS1 is a space formed by a sound guide hole 173a bored from front to back through a place in the first substrate 173 that corresponds to the microphone 174. The sound inlet 170a has formed therein a tapered sound-collecting portion 170e (see FIG. 2) whose inside diameter becomes gradually narrower toward the microphone 174, and the sound-collecting portion 170e has an inside space called "third sound guide space R3" (see FIG. 6). Moreover, the first sound guide space RS1 and the third sound guide space RS3 are connected to each other via the cylindrical second sound guide space RS2. A cylindrical sound insulation material 177 may be provided in contact with an inner wall surface of the second sound guide space RS2. Providing such a sound insulation material 177 makes it possible to suppress the propagation of vibration resulting from an external impact or shock made on the breathing sound measurement device 1 and the production of solid-borne sound within the sound guide space RS. Vibration of the breathing sound measurement device 1 results from the breathing sound measurement device 1 being rubbed by the bedding or the subject's hand, for example, in a case where the subject P makes a shift in body posture.

The sound insulation material 177 may be formed of any material; however, it is preferable that the sound insulation material 177 be formed of a material that, while absorbing solid vibration from the wearing section 130, hardly absorbs sound waves of breathing sound, acquired from the neck Pn, that pass through the second sound guide space RS2. As the sound insulation material 177, for example, an elastic material such as silicone rubber can be suitably used.

The contact section 170 has attached to a base end thereof a cover 175 configured to cover the first substrate 173. Further, the compression coil spring 178 is provided between the cover 175 and a top plate of the outer case 143. When the breathing sound measurement device 1 is worn on the neck Pn and the contact section 170 is brought into contact with the neck Pn, the contact section 170 is pressed into the housing space Q of the housing case 141, with the result that the amount of projection of the contact section 170 from an inner end face of the wearing section 130 varies. Furthermore, the action of the compression coil spring 178 brings the contact surface 170b into close contact with the skin of the neck Pn. This enhances adhesion to the skin of the subject's neck Pn and improves the wear comfort of the subject P, leaving less traces of digging into the skin of the subject P.

Figure 10:
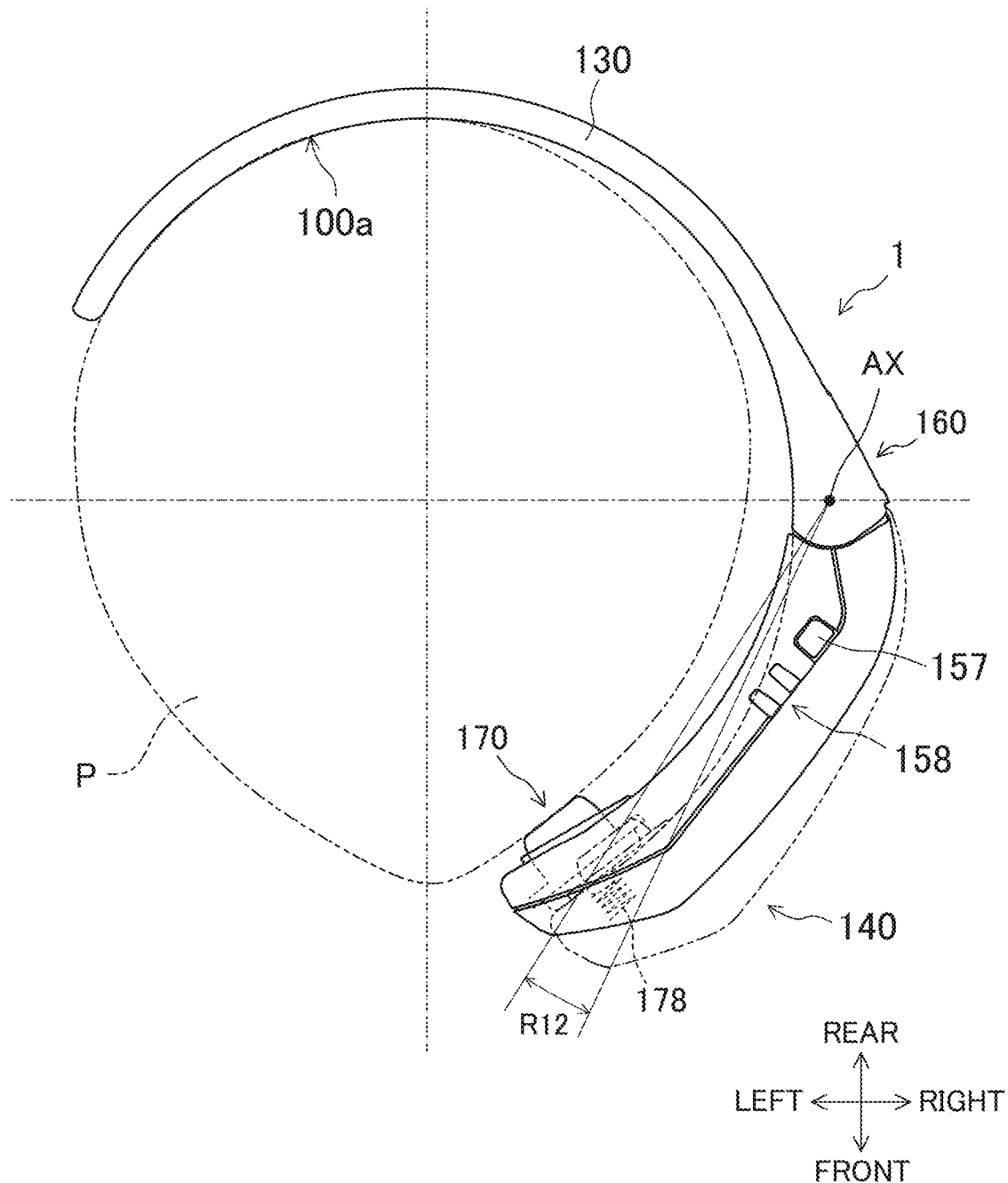
FIG. 10 is a schematic view showing an example in which a thin-necked subject is wearing the breathing sound measurement device.

FIG. 10 shows an example of a subject having a thinner neck than in FIG. 3. In the example shown in FIG. 10, if the measurement section 140 remains in the expanded position at the time of wearing of the breathing sound measurement device 1, the contact surface 170b of the contact section 170 does not come into contact with the neck Pn (see virtual lines in FIG. 10). In the present embodiment, in which the hinge section 160 is biased into the folded position, the measurement section 140 rotates toward the subject's neck Pn (i.e. inward). FIG. 10 shows an example of rotation at a rotation angle R12 (R11>R12). Further, since the measurement section 140 bites into the neck Pn, the inner surface 142c of the measurement section 140 near the neck Pn tilts inward. In the present embodiment, the angle of the contact surface 170b of the contact section 170 varies according to the force that the contact surface 170b receives from the neck Pn (see FIG. 10). That is, the angle of the contact surface 170b of the contact section 170 varies in conformance with the neck Pn. Further, the action of a biasing force of the compression coil spring 178 on the contact section 170 makes it possible to enhance the adhesion of the contact surface 170b to the subject's neck Pn.

Figure 11:
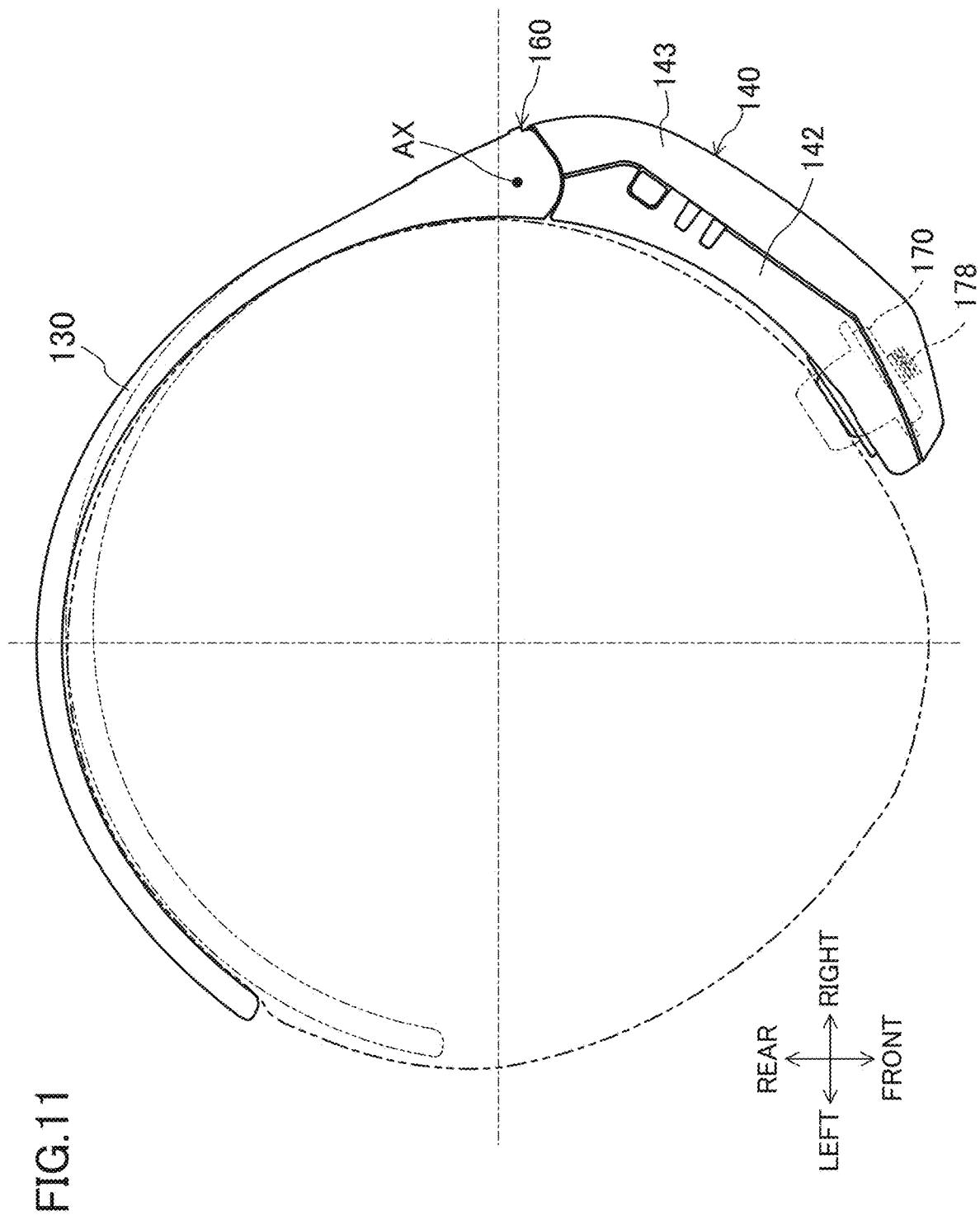
FIG. 11 is a schematic view showing an example in which a thick-necked subject is wearing the breathing sound measurement device.

FIG. 11 shows an example of a subject having a thicker neck than in FIG. 3. In the example shown in FIG. 11, although the neck Pn does not fit within the wearing section 130, the outer shape of the wearing section 130 increases in size at the time of wearing of the breathing sound measurement device 1, as the breathing sound measurement device 1 does not open more than it does in the expanded position. Moreover, a large portion of the contact section 170 is retracted into the housing space Q, with the result that the amount of projection of the contact section 170 from the measurement section 140 becomes very small. Performing such an operation prevents the contact section 170 from digging into the subject's neck Pn. Further, in this case too, the biasing force of the compression coil spring 178 acts to enhance the adhesion of the contact surface 170b to the subject's neck Pn.

As shown in FIGS. 10 and 11, which show examples in which the wearing section 130 is longer in length than in FIG. 3, the wearing section 130 may vary in length to bring about similar effects.

—Second Substrate—

With continued reference to FIG. 6, the second substrate 150 is disposed on top of the bottom plate of the inner case 142 (i.e. a plate beside the subject) to extend along a direction parallel with the length of the measurement section 140 (i.e. a direction parallel with the circumference of the wearing section 130). The second substrate 150 is fixed to the housing case 141. Specifically, the second substrate 150 is fixedly fitted to the partition wall 144, and the partition wall 144 is fixedly fitted to the inner case 142.

The second substrate 150 is mounted with a control section (not illustrated), a storage section (not illustrated) in which to store a measurement result, a communication module 153 configured to send a measurement result to an external device (e.g. a terminal device 180), an acceleration sensor (not illustrated) configured to detect a body posture/body motion, a connector 155 through which to communicate with the external device and charge the battery, a vibrator 156 configured to apply a stimulus to the subject, a power button 157 (see FIG. 2), a monitor light 158 (see FIG. 2) for use by the subject, a human detection sensor 159, or other components. The control section controls the operation of the breathing sound measurement device 1 as a whole. The control section is for example a microprocessor, and has a CPU, a memory, or other components. The control section is supplied with power from the battery 151, and operates in accordance with a program or other instructions stored in the storage section (not illustrated).

—Vibrator—

The vibrator 156 vibrates under the control of the control section. The vibrator 156 is controlled to vibrate, for example, in at least one of a state where the subject P is snorting at a predetermined volume level or above (hereinafter referred to as "snoring state") or an apneic state of the subject P.

The vibrator 156 is provided in an area in the housing space Q that is near the hinge section 160. The present embodiment illustrates an example in which the vibrator 156 is mounted at an end of the second substrate 150 that is beside the hinge section 160. The second substrate 150 is fixedly fitted to the partition wall 144. The partition wall 144 is fixedly fitted to the inner case 142. Moreover, a screw hole 145 (see FIG. 6) is formed to extend through the partition wall 144 from the bottom plate of the inner case 142. The inner case 142, the partition wall 144, and the outer case 143 are fixedly screwed by a screw 146 (see FIG. 6) inserted in the screw hole 145. That is, the vibrator 156 is configured such that vibration is transmitted to the housing case 141 through the second substrate 150 and the partition wall 144. Since the contact section 170 comes at least partly into contact with the housing case 141, the vibration transmitted to the housing case 141 is also transmitted to the contact section 170.

Further, the vibration of the vibrator 156 is also transmitted by a route of transmission to the wearing section 130 through the hinge section 160. This causes the vibration of the vibrator 156 to be transmitted to the neck Pn from both the measurement section 140 (including the contact section 170) and the wearing section 130. Note here that placing the vibrator 156 near the hinge section 160 as shown in FIG. 6 allows the vibration of the vibrator 156 to be easily transmitted to the wearing section 130. This makes it possible with a single vibrator 156 to suitably apply vibration to the subject from multiple points on the circumference of neck Pn.

—Other Components—

No dust preventive wall is provided between the contact section 170 and the first opening 142a of the inner case 142 to prevent entry of extraneous matter such as the subject's sweat (including moisture), dust, dirt, or other substances (hereinafter referred to simply as "extraneous matter"). This makes it possible to enhance the movability of the contact section 170. Meanwhile, a partition wall 144a configured to separate electronic components such as the second substrate 150 and the battery 151 or other components from the first opening 142a is provided in the housing space Q so that when the contact section 170 is pressed into the housing space Q, extraneous matter having entered through a gap between the contact section 170 and the first opening 142a of the inner case 142 does not enter the second substrate 150 or the battery 151.

As shown in FIG. 9, the partition wall 144 is provided in a place in the housing space Q that is between the inner case 142 and the outer case 143, and separates the two cases from each other. The partition wall 144 is fixed to the inner case 142 at an upper left corner 144c and a lower right corner 144d. Further, the partition wall 144 is configured to be fitted to the second substrate at a fitting junction 144e. The fitting junction 144e is constituted by a translucent material, for example, so that light from a light-emitting diode mounted on the second substrate 150 is displayed on the side plate of the measurement section 140. By thus acting to prevent the partition wall 144 from moving at the fitting junction 144e of the inner case 142 while the vibrator 156 is operating, vibration is propagated from the vibrator 156 to the inner case 142 without being attenuated.

The power button 157 is for example a push button, configured to project toward the outside of the side plate of the measurement section 140, that allows the subject P to perform an operation of turning on/off the breathing sound measurement device 1.

The monitor light 158 is constituted, for example, by a light-emitting diode. Seeing a light-emitting state of the monitor light 158 via the fitting junction 144e allows the subject P to check the power-on/off state, state of communication, state of charge, or other states of the breathing sound measurement device 1.

Although, in the forgoing embodiment, the wearing section 130 and the measurement section 140 are coupled to each other via the hinge section 160, this is not intended to impose any limitation. For example, although not illustrated, the wearing section 130 and the measurement section 140 may be integrally coupled to each other with the hinge section 160 omitted from the breathing sound measurement device 1 of the foregoing embodiment. In that case, the breathing sound measurement device 1 is in a shape that is equivalent to that which it assumes in the expanded state in the foregoing embodiment.

Second Embodiment

<Sleeping State Measurement System>

As shown in FIG. 1, a sleeping state measurement system includes a breathing sound measurement device 1 configured to measure breathing sound of a subject during sleep and a terminal device 80 configured to be capable of two-way communication with the breathing sound measurement device 1. The breathing sound measurement device 1 and the terminal device 80 may be directly connected to each other by either wire or Near Field Communication conforming to a communication standard such as Bluetooth (registered trademark), or may be connected to each other via a network such as Internet lines 21. FIG. 1 shows an example in which the breathing sound measurement device 1 and the terminal device 80 are connected to each other via the Internet lines 21. Further, in the example shown in FIG. 1, the terminal device 80 is connected to an external server device 22 and a different terminal device 23 via the Internet lines 21. Examples of the different terminal device 23 include, but are not limited to, a tablet PC and a smartphone. Assume here that the subject has two terminal devices, namely the terminal device 80 (e.g. a smartphone) and the different terminal device 23 (e.g. a tablet PC). The terminal device 80 and the different terminal device 23 may communicate with each other and share each other's data. Further, the server device 22 may communicate with a plurality of the terminal devices 80 to manage data received from the plurality of terminal device 80, analyze the data, and evaluate the data.

—Breathing Sound Measurement Device—

The breathing sound measurement device 1 is worn by a subject P on the subject's neck Pn before bedtime to measure the airflow sound of inhalation and exhalation during sleep (hereinafter referred to simply as "breathing sound"). Specifically, the breathing sound measurement device 1 is a neckband-shaped device configured to be wearable circumferentially on the subject's neck.

In the following description of the present embodiment, upward and downward directions and rightward and leftward directions are defined on the basis of a state of wearing of the breathing sound measurement device 1 by the subject P. Further, the front part (chest) of the subject is defined as "front", and the back part of the subject P is defined as "rear". Further, the "subject's side" is defined on the basis of a state of wearing of the breathing sound measurement device 1. A later description of a neckband 10, a measurement section 140, or other components may be given with the subject's side being "inner side" and the opposite side being "outer side".

Specifically, as shown in FIGS. 2 and 3, the breathing sound measurement device 1 has a configuration in which a neckband 10 formed in a circular arc shape (e.g. a substantially semicircular shape) and a measurement section 140 configured to measure breathing sound are coupled to each other via a hinge 160 of a well-known structure. The hinge 160 is a support configured to allow the measurement section 140 to rotate with respect to the neckband 10 between an expanded position indicated by solid lines in FIG. 3 and a folded position indicated by virtual lines in FIG. 3. The neckband 10 is an example of wearing means. The neckband 10 is equivalent to the wearing section 130 of the first embodiment.

The neckband 10 is formed, for example, in a circular arc shape (e.g. a substantially C shape) along the subject's neck Pn. The neckband 10 is configured such that the subject P spreads an opening of the neckband 10 to both ends, wears the neckband 10 onto the subject's neck Pn from behind the subject's neck Pn, and holds the subject's neck Pn with the neckband 10 circumferentially from outside (see FIG. 3).

The measurement section 140 has a housing case 141 having a housing space formed inside. The housing space houses an acceleration sensor 51, a microphone 52 (which is equivalent to the microphone 174 of the first embodiment), a photosensor 53 (which is equivalent to the human detection sensor 159 of the first embodiment), a vibrator 50 (which is equivalent to the vibrator 156 of the first embodiment), a monitor light 55 (which is equivalent to the monitor light 158 of the first embodiment), a communication module 56 (which is equivalent to the communication module 153 of the first embodiment), a substrate mounted with electronic components such as a microprocessor, and a battery 59 (which is equivalent to the battery 151 of the first embodiment) configured to supply power to the electronic components. The microprocessor has, for example, a CPU, a memory, or other components. In the memory, a program that is executed by the CPU is stored, and data on breathing sound as acquired by the microphone 52 is saved. The CPU for example controls the operation of the breathing sound measurement device 1 in accordance with the program stored in the memory. The CPU is an example of a control section 57 configured to control the overall operation of the breathing sound measurement device 1. The memory is an example of a storage section 58 in which to save breathing sound data acquired by the microphone 52.

Figure 12:
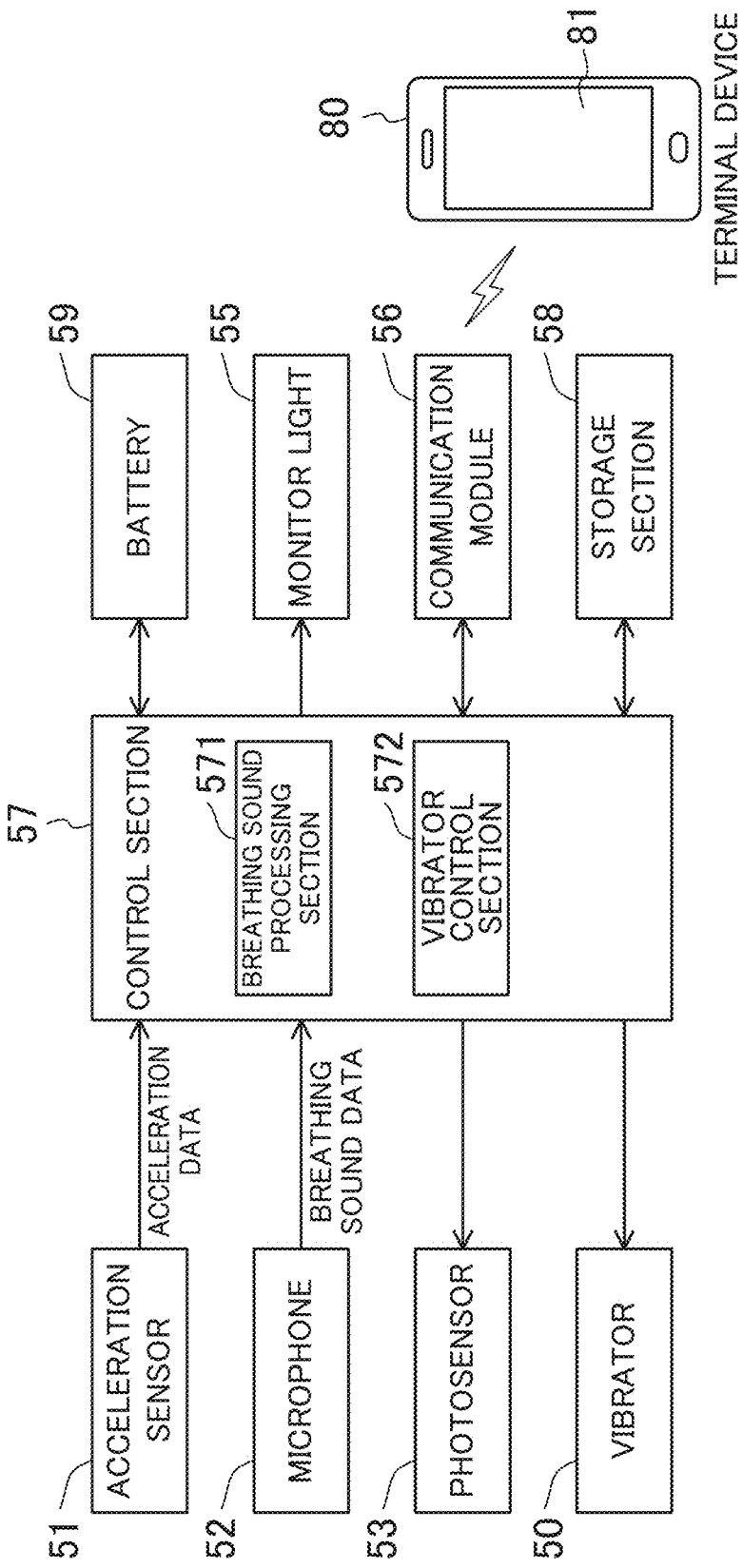
FIG. 12 is a block diagram showing an example configuration of the breathing sound measurement device.

FIG. 12 is a block diagram showing the configuration of the measurement section 140. The control section 57 includes a breathing sound processing section 571 configured to process breathing sound acquired by the microphone 52 and a vibrator control section 572 configured to control vibration of the vibrator 50. The operation of the control section 57 will be described later.

The measurement section 140 is provided with a contact section 170 projecting from an inner surface of the housing case 141 toward the subject. The contact section 170 has a sound inlet 170a, formed at a leading end thereof, through which to introduce breathing sound of the subject and a contact surface 170b formed in such a ring shape as to surround the sound inlet. The contact surface 170b comes into contact with the subject's neck Pn when the breathing sound measurement device 1 has been worn. The sound inlet 170a has a tapered shape whose inside diameter becomes gradually narrower toward the microphone 52 built in the measurement section 140. It should be noted that the contact section 170 may be retractably supported by the measurement section 140 and be biased in the direction of projection by an elastic member 178, such as a spring, attached to the measurement section 140. The contact section 170 and the microphone 52 are an example of breathing sound acquisition means.

The inner surface of the housing case 141 has an opening 142b formed in a rectangular shape in a substantially middle position in a circumferential direction and between upper and lower halves. The opening 142b is used as a measuring window through which to pass measuring light from the photosensor 53.

The housing case 141 has a side surface (upper surface) provided with a power button 157 in the form of a push button and the monitor light 55. Pressing the power button 157 allows the subject to turn on/off the breathing sound measurement device 1. The monitor light 55 displays the power-on/off state, state of communication, state of charge, or other states of the breathing sound measurement device 1. Further, the side surface of the housing case 141 may be provided with a connector through which to communicate with an external device and charge the battery.

The acceleration sensor 51 is configured to detect a body posture/body motion of the subject, and has a well-known structure.

The vibrator 50 vibrates under the control of the control section 57. For example, when the subject P is in an apneic state or the subject P is out-snoring, the vibrator 50 transmits vibration to the subject's neck Pn to make the subject P vary his/her body posture. A specific operation of the vibrator 50 will be described later. From the point of view of making it easy to transmit vibration to the subject's neck Pn, the vibrator 50 is attached in close contact with the housing case 141.

The communication module 56 is a wireless/wired module of a well-known structure, and is configured to be capable of two-way communication with a communication module 84 of the after-mentioned terminal device 80. The communication module 84 is an example of communication means.

Figure 13:
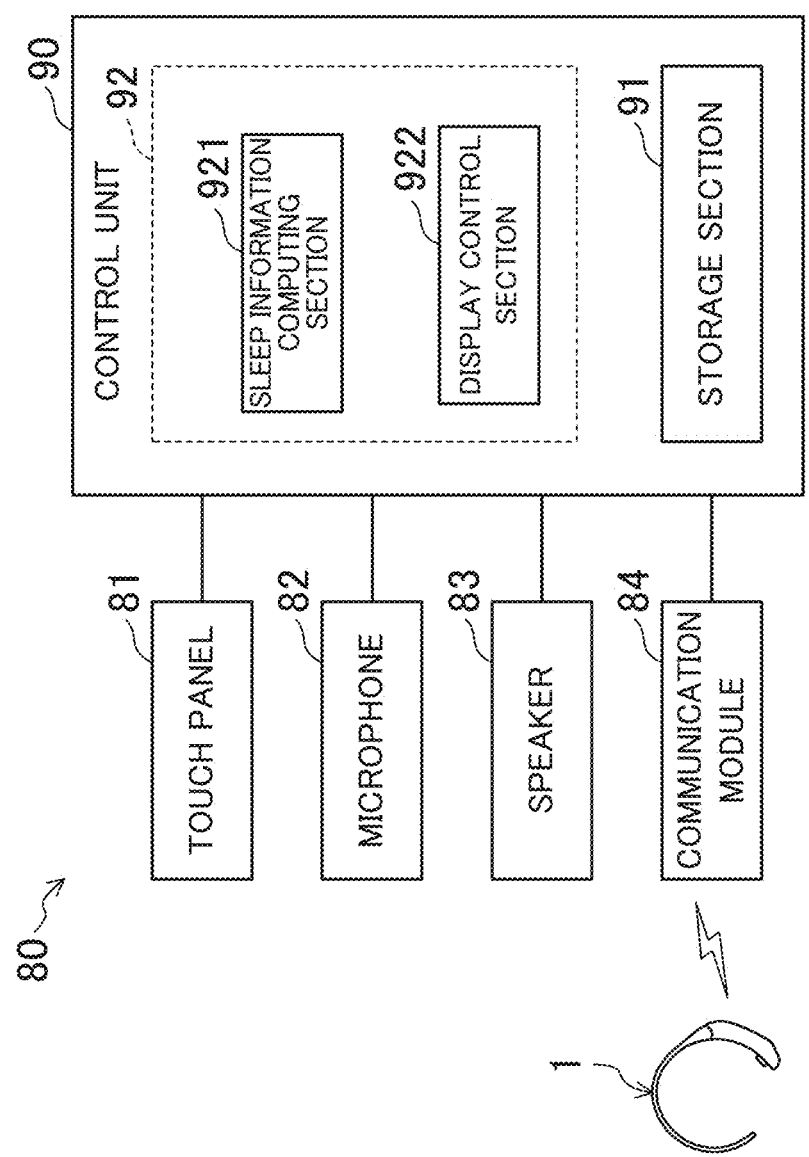
FIG. 13 is a block diagram showing an example configuration of a terminal device.

FIG. 13 is a block diagram showing an example configuration of the terminal device 80. It should be noted that FIG. 13 shows components configured to fulfill functions as the system of the present embodiment and does not show all functions related to the terminal device. The same applies to the aforementioned breathing sound measurement device 1.

—Terminal Device—

The terminal device 80 is for example a touch-panel smartphone or tablet PC. As shown in FIG. 13, the terminal device 80 includes a touch panel 81, a microphone 82, a speaker 83, a communication module 84, and a control unit 90. The control unit 90 includes a storage section 91 and a control section 92. The control section 92 includes a sleep information computing section 921 and a display control section 922.

The touch panel 81 functions as operating means configured to accept touch operations from the subject and functions as display means configured to display, on a display screen, content of the after-mentioned sleeping state measurement app.

The microphone 82 acquires voice data on the subject including snoring sound. In a case where the content of the sleeping state measurement app includes recording of snoring sound, snoring sound of the subject is acquired via the microphone 82 and saved in the storage section 91.

The speaker 83 reproduces various voices under the control of the control unit 90. For example, in a case where the terminal device 80 is mounted with a voice operation function based on voice recognition, a result based on a voice operation can be reproduced with a voice.

The communication module 84 is a wireless/wired module of a well-known structure, and is configured to be capable of two-way communication with the communication module 56 of the breathing sound measurement device 1. Further, as mentioned earlier, the communication module 84 is connected to the Internet lines 21 and connected to the external server device 22 and the different terminal device 23 via the Internet lines 21.

<Measurement and Display of Breathing Sound>

FIG. 14 is a flow chart showing an example of an operation of the sleeping state measurement system. FIG. 14 shows steps in an operation of the breathing sound measurement device 1 on the left side (steps S11 to S15) and steps in an operation of the terminal device 80 on the right side. Assume that the terminal device 80 has the sleeping state measurement app installed therein. The sleeping state measurement app is downloaded, for example, via the network.

In step S11, keeping the power button 157 pressed down in a state where the breathing sound measurement device 1 is off activates the breathing sound measurement device 1. In next step S12, the breathing sound measurement device 1 checks the power remaining in the battery 59, and in a case where the power remaining in the battery 59 is not sufficient, the breathing sound measurement device 1 is turned off and ends the process. On the other hand, the sufficient power is remaining in the battery 59, the operation continues.

In step S41, when the sleeping state measurement app of the terminal device 80 is launched, the terminal device 80 displays a home screen of the sleeping state measurement app.

Figure 15A:
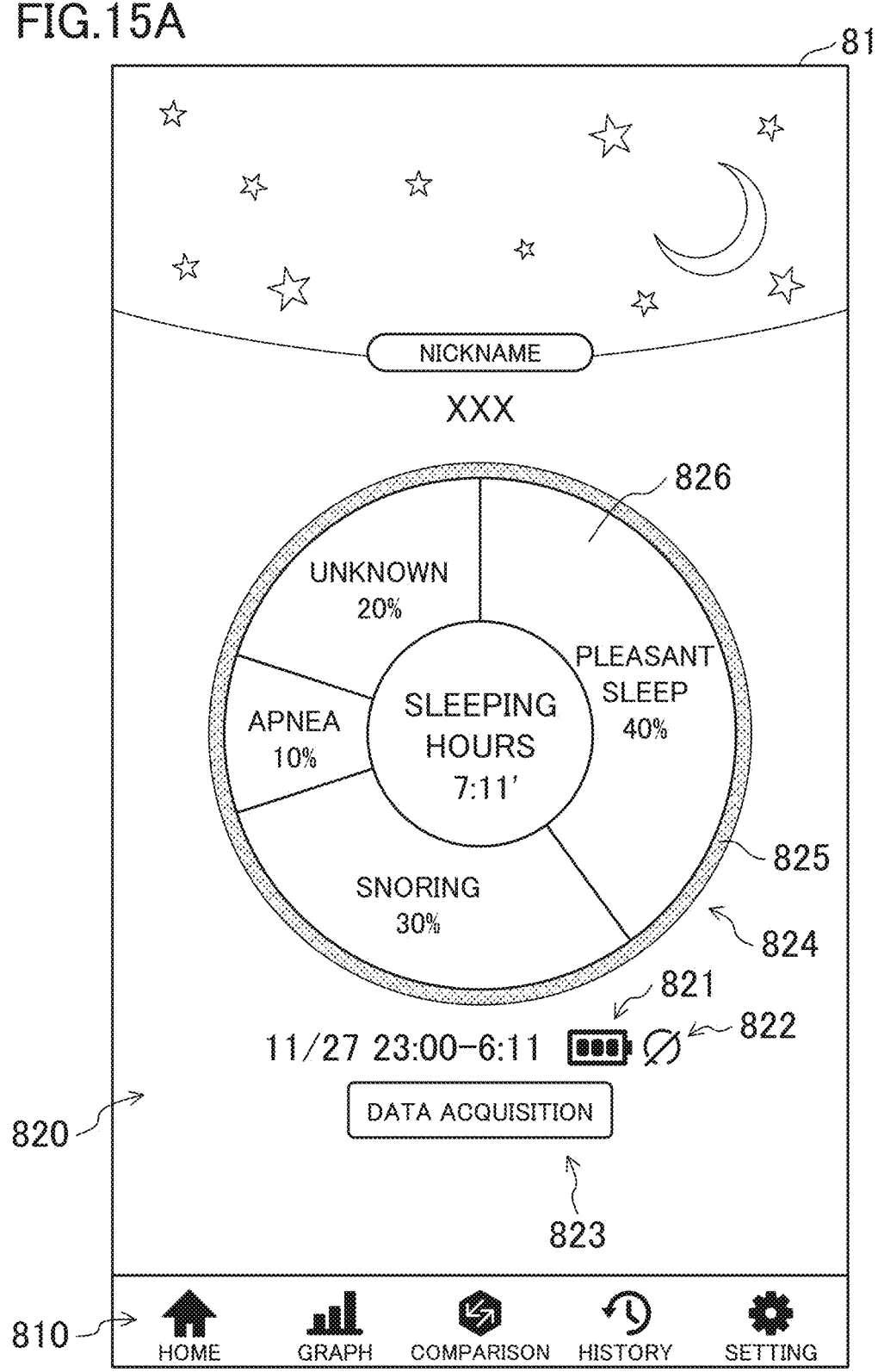
FIG. 15A is a diagram showing an example of a home screen of a sleeping state measurement app.

FIG. 15A shows an example of an image of the home screen of the sleeping state measurement app as displayed on the display screen 800 of the touch panel 81.

—Home Screen—

In the home screen, as shown in FIG. 15A, a belt-like menu bar 810 is placed at a lower end of the display screen 800, and the menu bar contains an arrangement of icons corresponding to selectable menus. In the example shown in FIG. 15A, (1) "HOME icon", which is used to return to the home screen, (2) "GRAPH icon", which is used to display a graph, (3) "COMPARISON icon", which is used to compare measurement data, (4) "HISTORY icon", which is used to check a history of measurements, and (5) "SETTING icon", which is used to proceed to a setting screen to configure various settings are arranged in sequence from the left side of the FIG. 15A.

In a central area 820 on the home screen (i.e. an area other than the menu bar), a pie graph 824 is displayed that shows a sleeping state (measurement result) of the subject. Although any measurement result may be displayed, the most recent measurement data is displayed in the example shown in FIG. 15A. The present embodiment illustrates an example of a graphical representation of sleeping hours (described in the center of the pie graph 824) classified into four categories "PLEASANT SLEEP", "SNORING", "APNEA", and "UNKNOWN". The category "PLEASANT SLEEP" represents a normal sleeping state. The category "SNORING" represents a snoring state and, specifically, represents a case where breathing sound measured by the breathing sound measurement device 1 is higher than or equal to a predetermined first threshold Vt1. The category "APNEA" represents a sleep apneic state and, specifically, represents a case where breathing sound measured by the breathing sound measurement device 1 is lower than a predetermined second threshold Vt2. The category "UNKNOWN" represents a period of time for which it was determined, in the control unit 90, that no accurate breathing sound measurement was made. A criterion for making a determination of "UNKNOWN" will be described later.

Further, in the home screen, level-of-sleep information indicating a level of sleep is displayed in the shape of a ring surrounding the pie graph (see a dot-hatched area 825 of FIG. 15A). The level-of-sleep information may be displayed in any manner. For example, a sleeping state is ranked on a scale, and a color corresponding to that rank is displayed. For example, (1) in a case where an apneic state is entered five or more times an hour, a red ring indicating the lowest level of sleep is displayed, (2) in a case where the proportion of a period of snoring to the sleeping hours is equal to or higher than a predetermined proportion, a yellow ring indicating an intermediate level of sleep is displayed, or (3) in a case where the sleeping hours are equal to or longer than a predetermined period of time in a case where the red or yellow ring does not apply, a green ring indicating a high level of sleep is displayed. Displaying sleep measurement data on the display screen 800 in this way allows the subject to check a result (overview) of measurement of a sleeping state without an operation other than an operation of launching the app. Further, a color representation of a level of sleep allows the subject to grasp the level of sleep at a glance without going through a laborious calculation.

In the example shown in FIG. 15A, for example, (1) remaining-battery-power information 821 indicating the power remaining in the battery of the breathing sound measurement device 1, (2) connection information 822 indicating a state of Bluetooth connection (state of communication) with the breathing sound measurement device 1, and (3) a data acquisition button 823 configured to cause the terminal device 80 to acquire data from the breathing sound measurement device 1 are displayed in addition to the aforementioned pie graph in the central area on the home screen.

—Setting Screen—

In step S41, when the sleeping state measurement app is launched, the subject configures various settings at the terminal device 80. Specifically, tapping of the "SETTING icon" by the subject opens the setting screen through which to configure various settings. Although not specifically illustrated, the setting screen allows setting a mode of operation of the breathing sound measurement device 1. Modes of operation of the breathing sound measurement device 1 are not limited to particular types. For example, the setting screen may be configured to allow choosing from among the following vibration modes: (1) a snoring and apnea reduction mode in which the vibrator 50 is caused to vibrate when the breathing sound measurement device 1 has made a determination of snoring (such a time being hereinafter referred to as "time of determination of snoring") or has made a determination of apnea (such a time being hereafter referred to as "time of determination of apnea"), (2) a snoring reduction mode in which the vibrator 50 is caused to vibrate only at the time of determination of snoring, (3) an apnea reduction mode in which the vibrator 50 is caused to vibrate only at the time of determination of apnea, and (4) a monitoring mode in which the vibrate 50 is prohibited from vibrating.

Further, for example, the setting screen may be configured to allow setting snoring detection sensitivity (i.e. the ease with which snoring is detected) or may be configured to allow setting the intensity of vibration of the vibrator 50. Further, the setting screen may be configured to allow configuring such a setting that the vibration of the vibrator 50 is suspended for a predetermined period of time after a predetermined period of time has elapsed since the vibrator 50 started to vibrate. Further, the setting screen may be configured to allow a timer setting, i.e. setting of the times at which the breathing sound measurement device 1 starts and ends a measurement. In a case where the subject does not change the settings, the aforementioned setting process is skipped.

<<Process of Establishing Communication>>

Further, once the sleeping state measurement app is launched, a process for establishing communication between the terminal device 80 and the breathing sound measurement device 1 (hereinafter referred to as "communication establishing process") is executed. The communication establishing process involves the use of a well-known technique. For example, in a case where the breathing sound measurement device 1 is used for the first time, the setting screen may be configured to allow the terminal device 80 to select and register the breathing sound measurement device 1 with which the terminal device 80 communicates. Doing so may reduce the time and processing needed for the communication establishing process.

Once the terminal device 80 and the breathing sound measurement device 1 become enabled to communicate with each other, a time synchronization process of causing the terminal device 80 and the breathing sound measurement device 1 to operate at the same rate is executed. The time synchronization process is not limited to particular methods but, for example, includes sending time information on the terminal device 80 to the breathing sound measurement device 1 and causing the breathing sound measurement device 1 to reflect the time information in a real-time clock thereof. Performing the time synchronization process in this way makes it possible to prevent a time lag between measurement data and display data. Further, setting information set in the aforementioned setting screen is sent from the terminal device 80 to the breathing sound measurement device 1.

Upon completion of the time synchronization process, the breathing sound measurement device 1 cuts off communication with the terminal device 80, enters a measurement mode (breathing sound measurement), and turns off the communication module 56. Turning off the communication module 56 in this way in the absence of exchange of data allows the battery 59 to last long.

<<Process of Measuring Breathing Sound>>

Figure 16A:
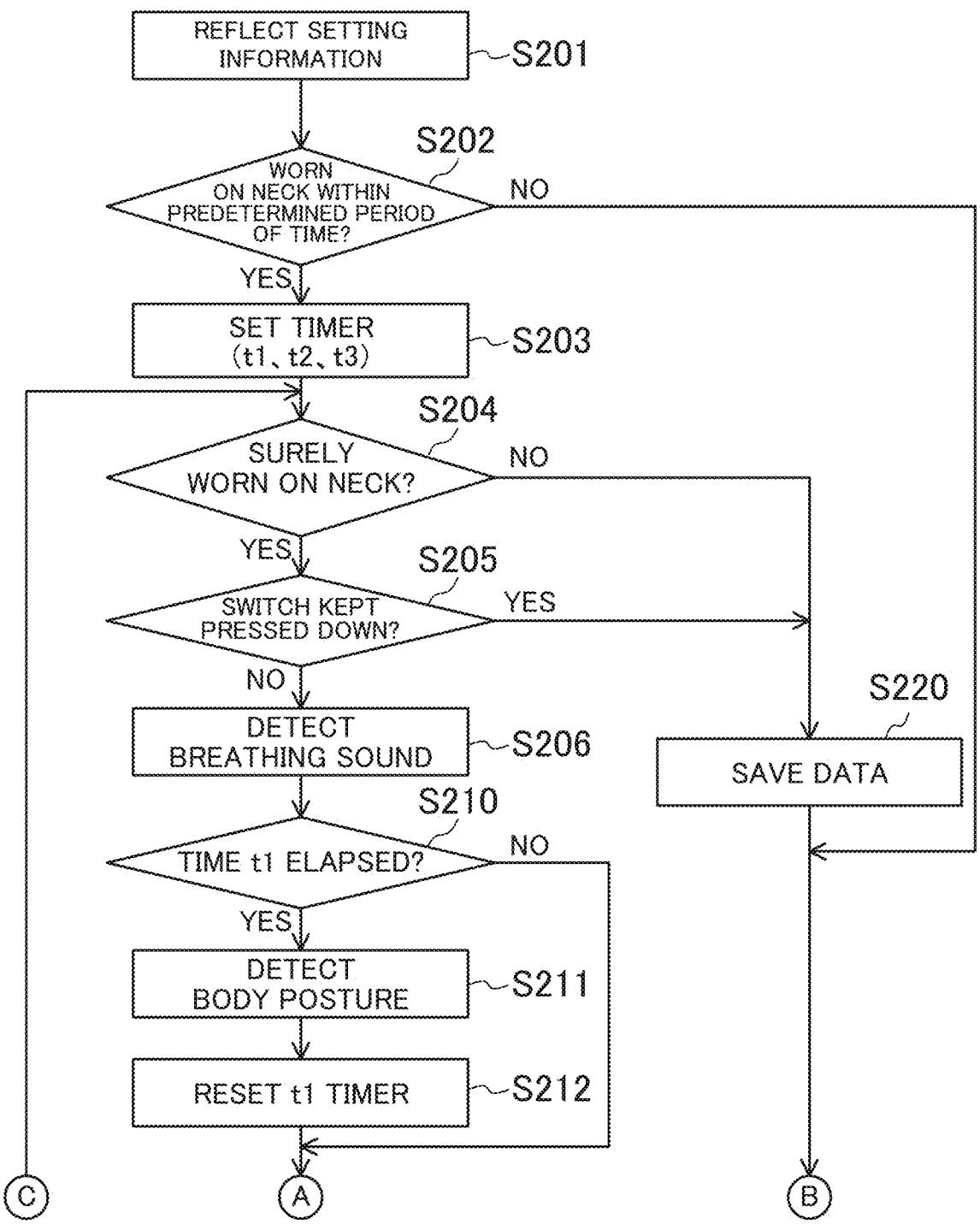
FIG. 16A is a flow chart showing an example of a breathing sound measurement process that is executed by the breathing sound measurement device.
Figure 16B:
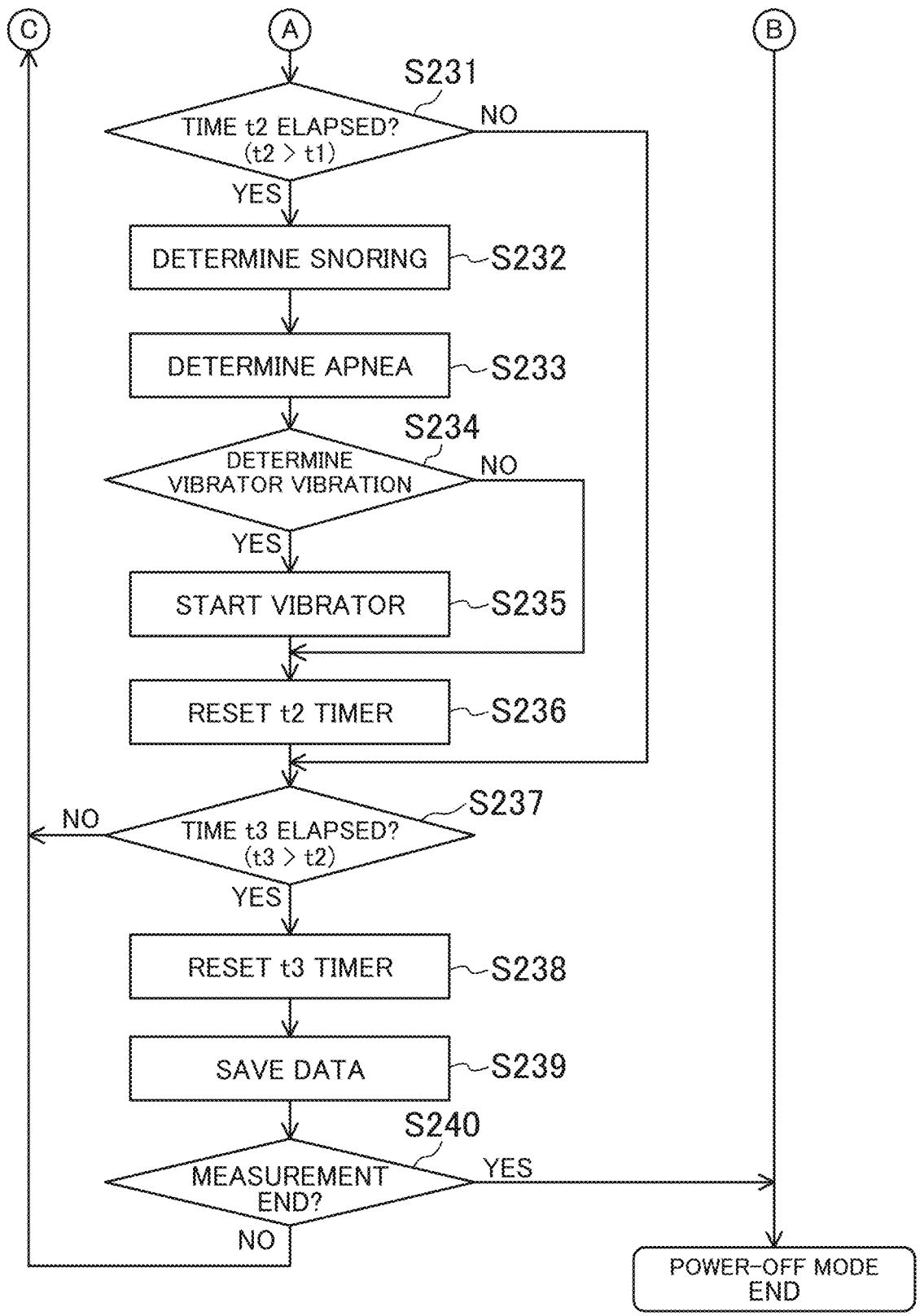
FIG. 16B is a flow chart showing an example of a breathing sound measurement process that is executed by the breathing sound measurement device.

After that, in step S13, the breathing sound measurement device 1 executes a process of measuring breathing sound. FIGS. 16A and 16B show an example of a process of controlling the process of measuring breathing sound in step S13 of FIG. 14.

As shown in FIG. 16A, in step S201, setting information received from the terminal device 80 is reflected. The setting information is stored as defaults in advance in the storage section 58, and the control section 57 rewrites changes in the setting information into the storage section 58.

In next step S202, the control section 57 determines whether the subject has worn the breathing sound measurement device 1 on the neck within a predetermined period of time. Whether the breathing sound measurement device 1 has been worn on the subject's neck is determined, for example, on the basis of measurement results yielded by the acceleration sensor 51 and the microphone 52. In a case where the wearing of the breathing sound measurement device 1 cannot be confirmed even when the predetermined period of time has elapsed (NO in S202), the control section 57 turns off the breathing sound measurement device 1 and ends the process. An example of the predetermined period of time it takes to confirm wearing is, but is not limited to, approximately several minutes.

When the control section 57 has confirmed the wearing of the breathing sound measurement device 1 (YES in S202), the control section 57 configures the timer settings for breathing sound measurement (step S203). For example, three different periods of time t1, t2, and t3 (t1<t2<t3) are set.

The control section 57 reconfirms that the breathing sound measurement device 1 is worn on the subject's neck (step S204), confirms that the power button 157 is not being kept pressed down (step S205), and starts a step of measuring breathing sound (step S206). Specifically, the control section 57 measures breathing sound of the subject on the basis of voice data outputted from the microphone 52. The measurement of the breathing sound of the subject is continuously executed for a period until the end of the measurement.

In parallel with the measurement of the breathing sound, the control section 57 detects a body posture of the subject every predetermined period of time t1 on the basis of acceleration data obtained from the acceleration sensor 51 (steps S210 to S212).

Proceeding to FIG. 16B, in parallel with the measurement of the breathing sound, the breathing sound processing section 571 of the control section 57 determines the presence or absence of snoring and the presence or absence of the occurrence of sleep apnea every predetermined period of time t2 on the basis of the volume level of the voice data (breathing sound) acquired by the microphone 52 (steps S231 to S233).

FIG. 17 shows an example of a result of measurement of breathing sound of a subject through the use of the breathing sound measurement device 1. An upper row of FIG. 17 shows a measured waveform of voice data acquired from the microphone 52. In the measured waveform shown in FIG. 17, the horizontal axis represents time of measurement, and the vertical axis represents the volume level of the breathing sound. Further, a middle row of FIG. 17 shows a result of determination of a sleeping state by the breathing sound measurement device 1 based on the volume level of the breathing sound.

Specifically, in the present embodiment, as shown in FIG. 17, the breathing sound measurement device 1 makes a determination of snoring in a case where the volume level of breathing sound acquired from the microphone 52 is higher than or equal to the predetermined first threshold Vt1. Further, the breathing sound measurement device 1 makes a determination of apnea in a case where the volume level of breathing sound acquired from the microphone 52 is lower than the predetermined second threshold Vt2, and makes a determination of a normal sleeping state (pleasant sleep) in a case where the volume level of breathing sound acquired from the microphone 52 is between the first threshold Vt1 and the second threshold Vt2.

Returning to FIG. 16B, in step S234, the vibrator control section 572 of the control section 57 makes a determination of vibration of the vibrator. Specifically, the vibrator control section 572 checks a vibration mode sent from the terminal device 80. Then, in a case where the conditions are met on the basis of the vibration mode and the results of determination of snoring and apnea, the vibrator control section 572 proceeds to step S235, in which the vibrator control section 572 causes the vibrator to vibrate. For example, when a determination of snoring has been made in a case where the vibration mode is configured to set up vibrations at the time of determination of snoring, the vibrator control section 572 causes the vibrator to vibrate. In next step S236, the period of time t2, which serves as a criterion for determining whether to make a determination in step S231, is reset.

In next steps S237 to S239, the control section 57 saves, every predetermined period of time t3, the aforementioned results of determination and measurement data taken from the sensors. An example of a destination location is, but is not limited to, the storage section 58 built in the breathing sound measurement device 1. Further, the data may be sent to the terminal device 80 or other devices via the communication module 56 every predetermined period of time t3 to be stored in the storage section inside the terminal device 80 or to be displayed on the display screen 800 of the terminal device 80.

Then, the terminal device 80 repeatedly executes the process from step S204 to step S239 and, when a predetermined period of time of measurement has elapsed, makes a YES determination in step S240, and the control section 57 turns off the breathing sound measurement device 1 and ends the process. Further, in a case where during the measurement of the breathing sound, the breathing sound measurement device 1 comes free from the subject's neck or the power button 157 is kept pressed down, the control process proceeds to step S220, in which results of determination up to that point in time and measurement data taken from the sensors are saved in the storage section 58. Then, the breathing sound measurement device 1 is turned off, and the process comes to an end.

<<Process of Acquiring Measurement Data>>

With continued reference to FIG. 14, for example, when the subject depresses the data acquisition button 823 in the morning, the terminal device 80 executes a process of acquiring measurement data. Specifically, the aforementioned communication establishing process is executed to enable the terminal device 80 and the breathing sound measurement device 1 to communicate with each other. After the establishment of communication, the terminal device 80 sends the breathing sound measurement device 1 a request for measurement data (including breathing sound data (step S42), and the breathing sound measurement device 1 sends the terminal device 80 measurement data measured by the microphone 52. Note here that the measurement data includes breathing sound data on the subject, body posture data, time data such as data on a point in time at which the power button 157 was pressed, or other data.

Upon completion of the transmission of the measurement data, the breathing sound measurement device 1 notifies the terminal device 80 of the end of the data transmission and turns off a communication function (step S15). Upon completion of the acquisition of the measurement data, the terminal device 80 executes a display process (step S43). It should be noted that the breathing sound measurement device 1 may be configured to send data to the terminal device 80 regardless of the presence or absence of the pressing of the data acquisition button 823 by the subject. Further, the breathing sound measurement device 1 may be configured to send data to the terminal device 80 on the basis of a predetermined amount of data accumulation.

<<Process of Displaying Sleeping State Information>>

In step S43, the sleep information computing section 921 of the control unit 90 of the terminal device 80 generates display data on the basis of the measurement data received from the breathing sound measurement device 1. Then, the display control section 922 causes the display data generated by the sleep information computing section 921 to be displayed on the display screen 800.

The following describes, with reference of illustrations of display screens, specifics of computations carried out by the sleep information computing section 921.

—Graph Screen—

Figure 15B:
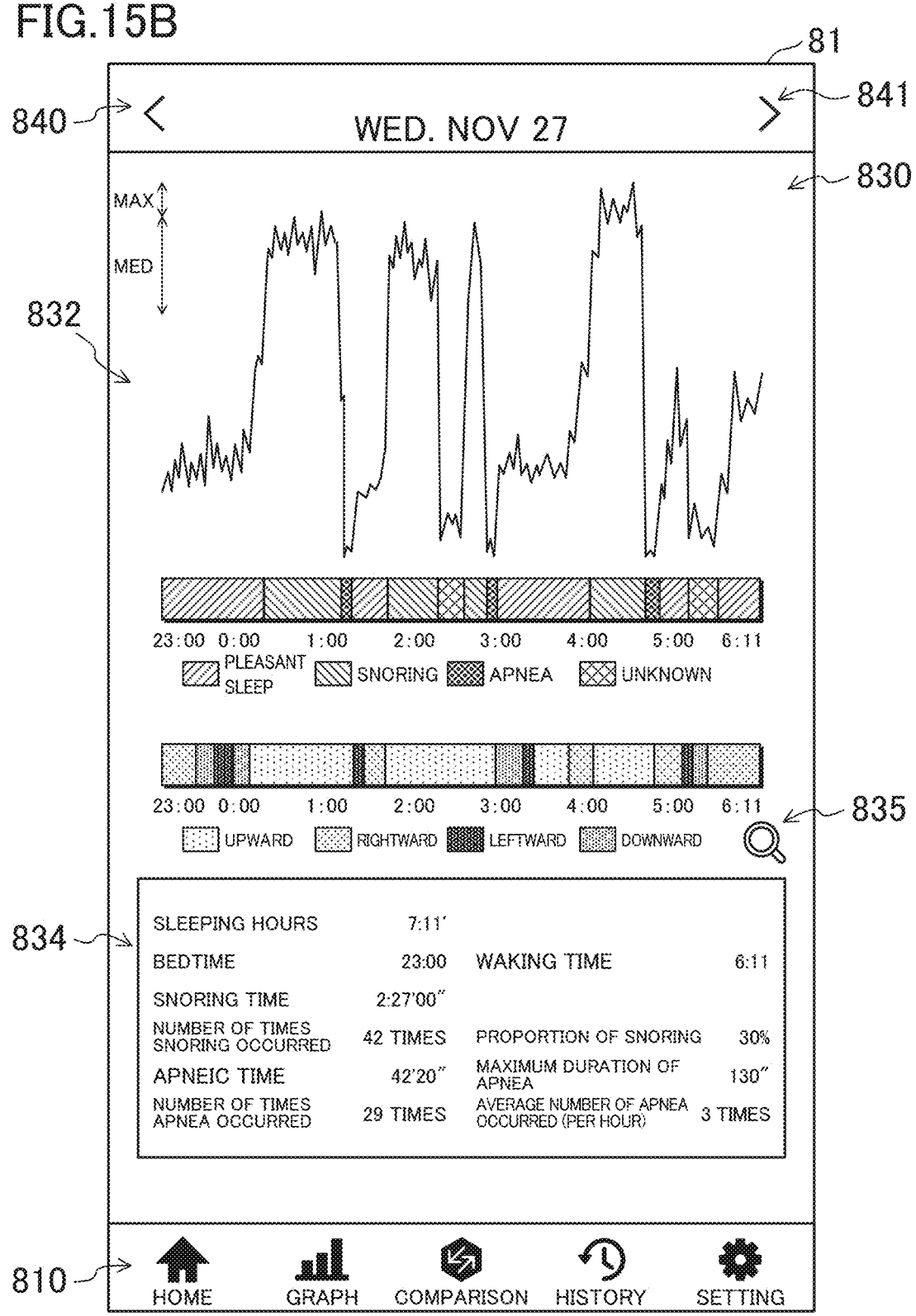
FIG. 15B is a diagram showing an example of a graph screen of the sleeping state measurement app.

FIG. 15B shows an example of an image that is displayed on the display screen 800 in a case where the aforementioned graph icon has been tapped. In the following, the whole screen shown in FIG. 15B is called "graph screen".

At a lower end of the graph screen, the aforementioned menu bar 810 is placed. The menu bar 810 is displayed in such a manner as to show that the graph screen is being selected. In an upper end area 840 on the graph screen, the date of acquisition of data to be displayed is indicated, and tapping a slide button 841 can change from displaying one date to displaying another.

In a data display area 830 in the middle of the graph screen (i.e. an area other than the menu bar and the upper end area), information indicating a sleeping state (result of measurement) of the subject is displayed. A lower row of the data display area 830 is for example a text area 834 where sleeping state information on the subject is displayed in text form. Any item may be displayed in the text area 834. For example, as sleeping hours information regarding hours of sleep of the subject, total sleeping hours that night, bedtime, and waking time are displayed. For example, as snoring information on the subject, the sum of periods of time during which the subject snored during the sleeping hours (hereinafter referred to simply as "snoring time"), the number of times the subject snored, and the proportion of snoring to the sleeping hours are displayed. For example, as apnea information on the subject, the sum of periods of time during which the subject stopped breathing temporarily during the sleeping hours (hereinafter referred to simply as "apneic time"), the number of times the subject stopped breathing temporarily, the maximum duration of apnea, and the average number of times the subject stopped breathing temporarily per hour are displayed.

The sleep information computing section 921 generates the sleeping hours information, the snoring information, and the apnea information and carries out a computation on the basis of received measurement data. For example, the sleep information computing section 921 counts, as the number of times the subject snores, the number of times the volume level of breathing sound crosses the aforementioned first threshold Vt1 from a lower volume level toward a higher volume level. Similarly, the sleep information computing section 921 counts, as the number of times the subject stops breathing temporarily, the number of times the volume level of breathing sound crosses the aforementioned second threshold Vt2 from a higher volume level toward a lower volume level.

An upper row of the data display area 830 is a graph area 832 where sleeping state information on the subject is displayed in graph form. Any form of graph may be displayed in the graph area 832. In the example shown here, however, a combination of a line graph and bar graphs is displayed.

The line graph provides a visual understanding of the magnitude of snoring during a sleep period. The sleep information computing section 921 generates a graph on the basis of received measurement data by plotting breathing sound at different points in time. A range of volume levels may be illustrated as indicated on the upper left of the data display area 830 of FIG. 15B so that the subject can easily see the magnitude of snoring. Further, although not illustrated, an area higher than or equal to a predetermined volume level may be distinguished by using a different color, or as shown in FIG. 17, the area may be divided into subareas by drawing a line at the first threshold Vt1 and/or drawing a line at the second threshold Vt2.

The bar graph in the upper row shows an example in which sleeping states in the sleep period are each classified into one of the four aforementioned categories "PLEASANT SLEEP", "SNORING", "APNEA", and "UNKNOWN" and sleeping states in different time slots are displayed. Further, the bar graph in the lower row shows an example in which body posture information on the subject is displayed. The sleep information computing section 921 computes sleeping states and body posture states in different time slots, for example, on the basis of received measurement data.

Data on the sleeping states and the body posture states may be displayed in any form. For example, regarding the sleeping states, as shown in the middle row of FIG. 17, raw data obtained by making a determination based on a relationship between the volume level of breathing sound and the first and second thresholds Vt1 and Vt2 may be displayed, and processed data obtained by processing the raw data may be displayed.

Further, although, in FIG. 15B, a display is performed so that whole results of the sleeping hours can be seen, this is not the only way to perform a display. For example, a zoom icon 835 that allows zoom display may be displayed within the graph screen. FIG. 15E shows an example of a screen that is displayed in a case where the zoom icon 835 has been tapped and, specifically, shows an example in which a sleeping state of one hour is displayed. In FIG. 15E, scrolling through the graph area by swiping (i.e. moving a finger from the right to the left and from the left to the right) through the graph area allows changing from displaying one time slot to displaying another. Such a display format allows the subject to check both overview and detailed information.

It should be noted that instead of being displayed by the hour, the sleeping hours may be displayed by another length of time.

<<Processing of Display Data>>

The following illustrates processing of data.

For example, regarding an apneic display, in a case where it is determined that apnea continues for a predetermined specified period of time (e.g. five minutes) or longer, the area of determination may be displayed as "UNKNOWN" or excluded from the target of display. The breathing sound measurement device 1 of the present embodiment makes a determination of apnea in a case where the volume level of breathing sound is lower than the predetermined second threshold Vt2. Meanwhile, the subject may move during sleep, with the result that the breathing sound measurement device 1 may become detached temporarily from the subject's neck Pn. Accordingly, in a case where a period of time during which the volume level of breathing sound data is lower than the second threshold Vt2 has continued for the predetermined specified period of time or longer, the area of determination is displayed as "UNKNOWN" or excluded from the target of display. This makes it possible to distinguish between a case where the breathing sound measurement device 1 is detached from the subject's neck Pn and an apneic state.

FIG. 17 shows an example in which the breathing sound volume level of the subject fell below the second threshold Vt2 five times when a period from a time point t6 to a time point t7 and a period from a time point t14 to a time point t15 are longer than the aforementioned specified period of time and are determined as "UNKNOWN". The periods of "UNKNOWN" are cancelled, for example, next time breathing sound is taken (see, for example, the time point t7 and the time point t15).

Further, there may be a quick transition from a snoring state to an apneic state. In such a case, there may be a period that is determined as "PLEASANT SLEEP". In a case where the period of "PLEASANT SLEEP" is shorter than a predetermined period of time, the period of "PLEASANT SLEEP" may be merged into a period of snoring or apnea preceding or following the period of "PLEASANT SLEEP" (see, for example, a period from a time point t2 to a time point t4).

—Comparison Screen—

Figure 15C:
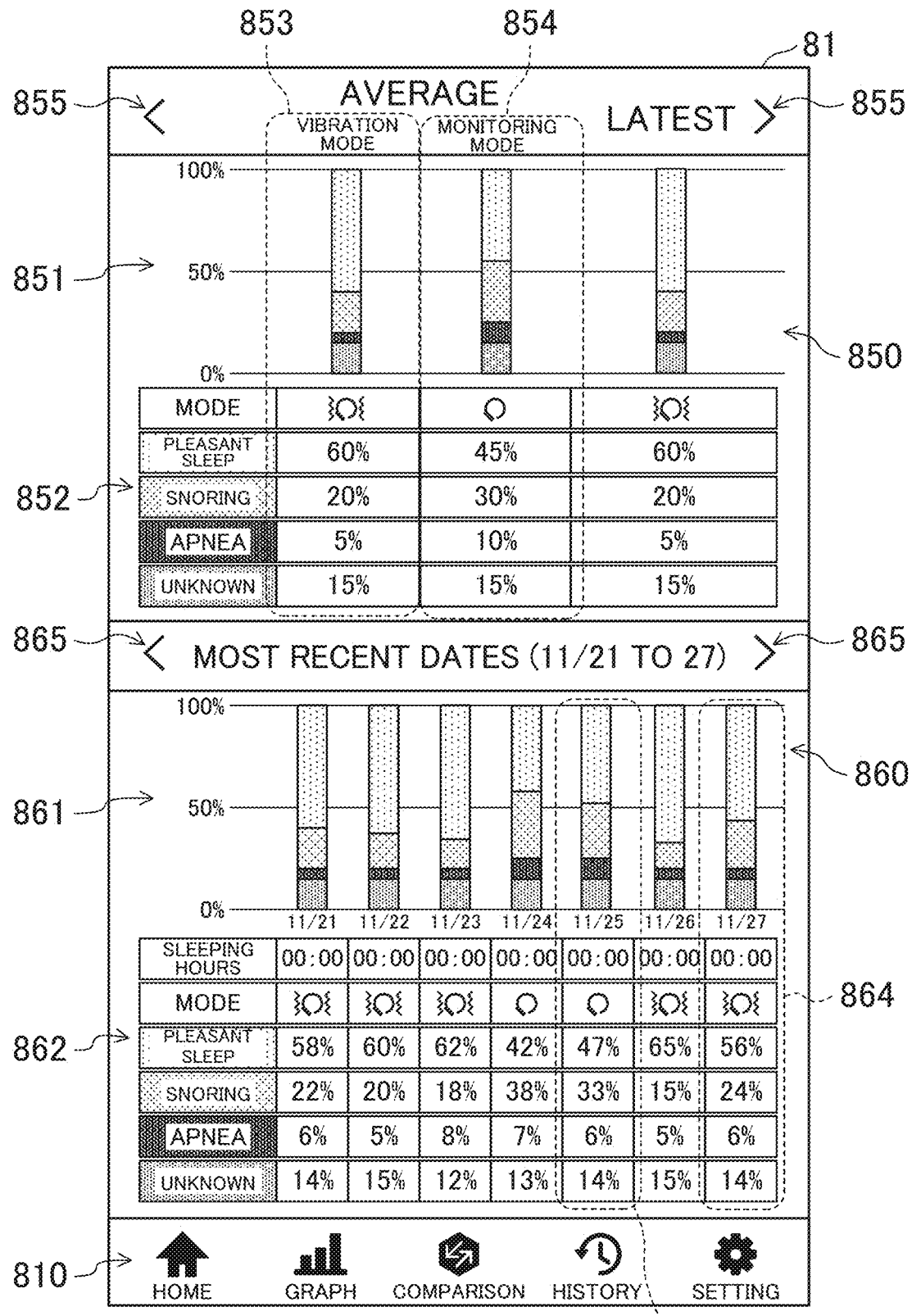
FIG. 15C is a diagram showing an example of a comparison screen of the sleeping state measurement app.

FIG. 15C shows an example of an image that is displayed on the display screen 800 in a case where the comparison icon of the aforementioned menu bar 810 has been tapped. In the following, the whole screen shown in FIG. 15C is called "comparison screen". The aforementioned menu bar 810 is displayed in such a manner as to show that the comparison screen is being selected.

In a data display area in the middle of the comparison screen (i.e. an area other than the menu bar), a case where the vibrator is caused to vibrate and a case where the vibrator is prohibited from vibrating are displayed in juxtaposition with each other. In the example shown here, results of the vibration mode and measurement results of the monitoring mode are displayed.

Specifically, in the example shown in FIG. 15C, the data display area is divided into two areas, namely upper and lower areas. The upper screen in the data display area is an average comparison area 850 where averages are compared, and the lower screen is a day-to-day comparison area 860 where day-to-day data are compared. Both the upper and lower areas show comparison results as bar graphs in the upper areas 851 and 861 and show comparison results as numerical values in the lower areas 852 and 862.

The average comparison area 850 contains a left area 853 where the results of the vibration mode are shown, a central area 854 where the results of the monitoring mode are shown, and a right area where latest results are shown. Displaying such a juxtaposition of a case where the vibrator is caused to vibrate and a case where the vibrator is prohibited from vibrating allows the subject to easily ascertain the efficacy of use of the vibration mode. Further, although not specifically illustrated, for example, in a case where there are a plurality of the vibration modes, displaying them in juxtaposition with one another allows each subject to quantitatively compare and grasp, for example, which mode to use to attain a high degree of effectiveness. Reference numeral 855 denotes a slide button, and tapping the slide button makes it possible to display comparison results from another standpoint or of another content.

The day-to-day comparison area 860 allows grasping a sleeping state through a bar graph and numerical values about day-to-day measurement results. The column "MODE" shows identification symbols that indicate whether the vibration mode and the monitoring mode is being used. Moreover, in a case where the subject has used both the monitoring mode and the vibration mode within the currently displayed period, the day-to-day comparison area 860 too shows the results of the monitoring mode (see a dashed-line area 863) and the results of the vibration mode (see a dashed-line area 864) in juxtaposition with each other. This allows the subject to compare and verify relationships between the modes used and the effects of the modes in consideration of his/her physical condition and the surrounding environment. Reference numeral 855 denotes a slide button, and tapping the slide button makes it possible to display comparison results from another standpoint or of another content.

—History Screen—

Figure 15D:
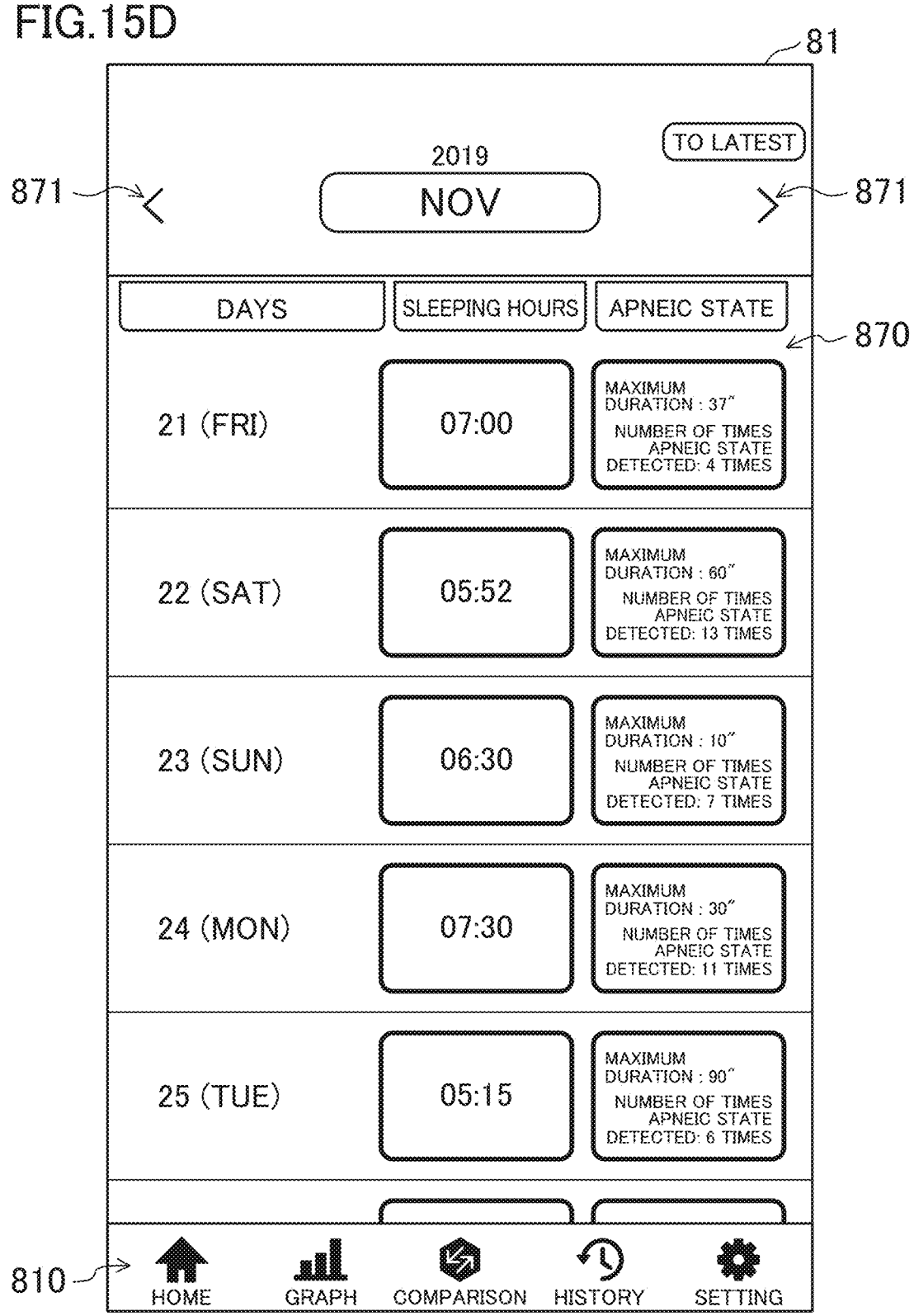
FIG. 15D is a diagram showing an example of a history screen of the sleeping state measurement app.
Figure 15E:
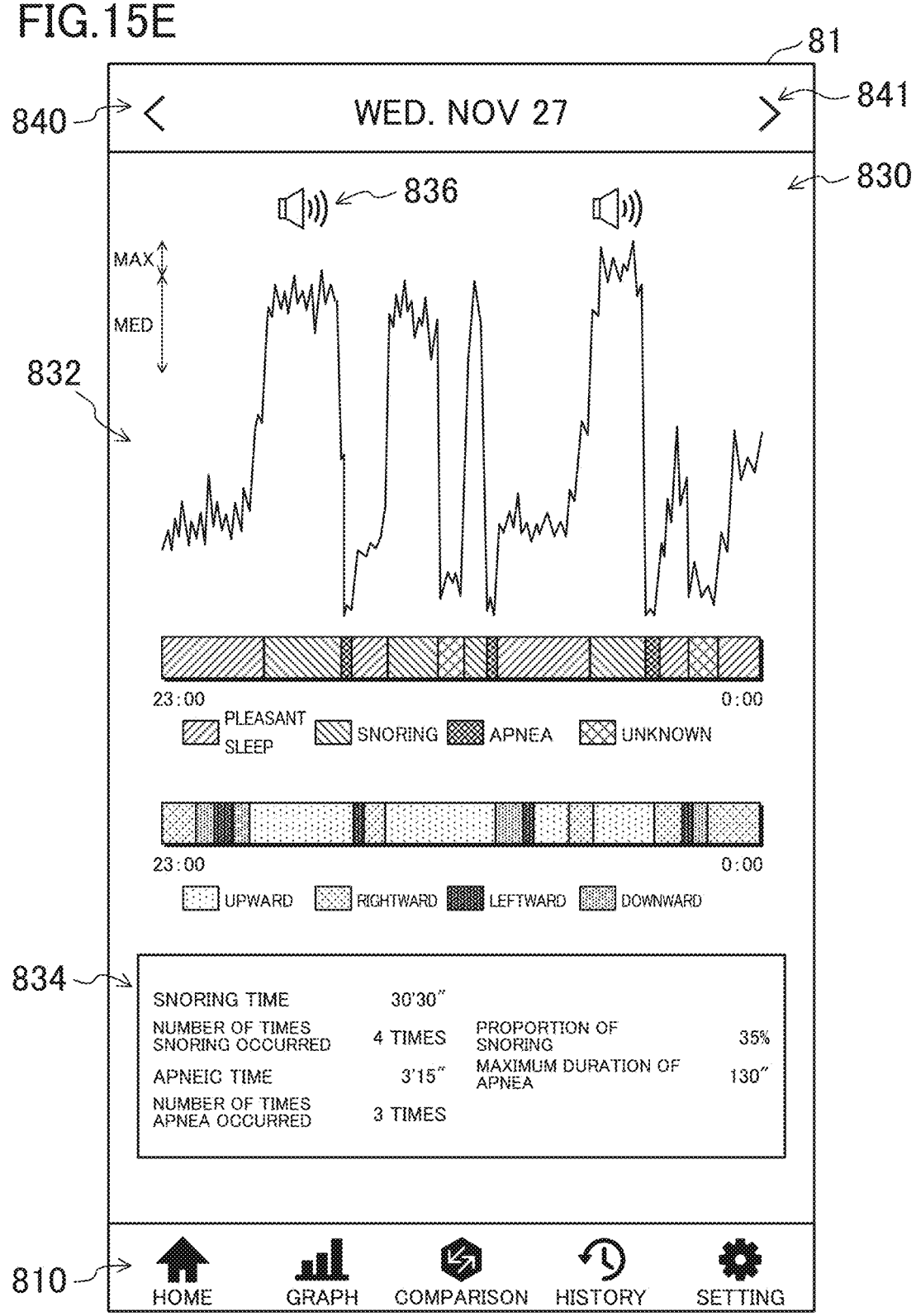
FIG. 15E is a diagram showing an example of the graph screen of the sleeping state measurement app.

FIG. 15D shows an example of an image that is displayed on the display screen 800 in a case where the aforementioned history icon has been tapped. In the following, the whole screen shown in FIG. 15D is called "history screen".

At a lower end of the history screen, the aforementioned menu bar 810 is placed. The menu bar 810 is displayed in such a manner as to show that the history screen is being selected. The history screen contains an upper end area 840 where the period to be displayed (e.g. the month and year to be displayed) is shown, and tapping a slide button 871 allows changing from displaying one date to displaying another.

In a data display area 870 in the middle of the comparison screen (i.e. an area other than the menu bar), a measurement history list can be checked. For example, in the example shown in FIG. 15D, a monthly list of data can be checked by scrolling up and down.

Other Embodiments

For example, in addition to the foregoing embodiments, a configuration may be set up so that snoring sound can be recorded.

Figure 18:
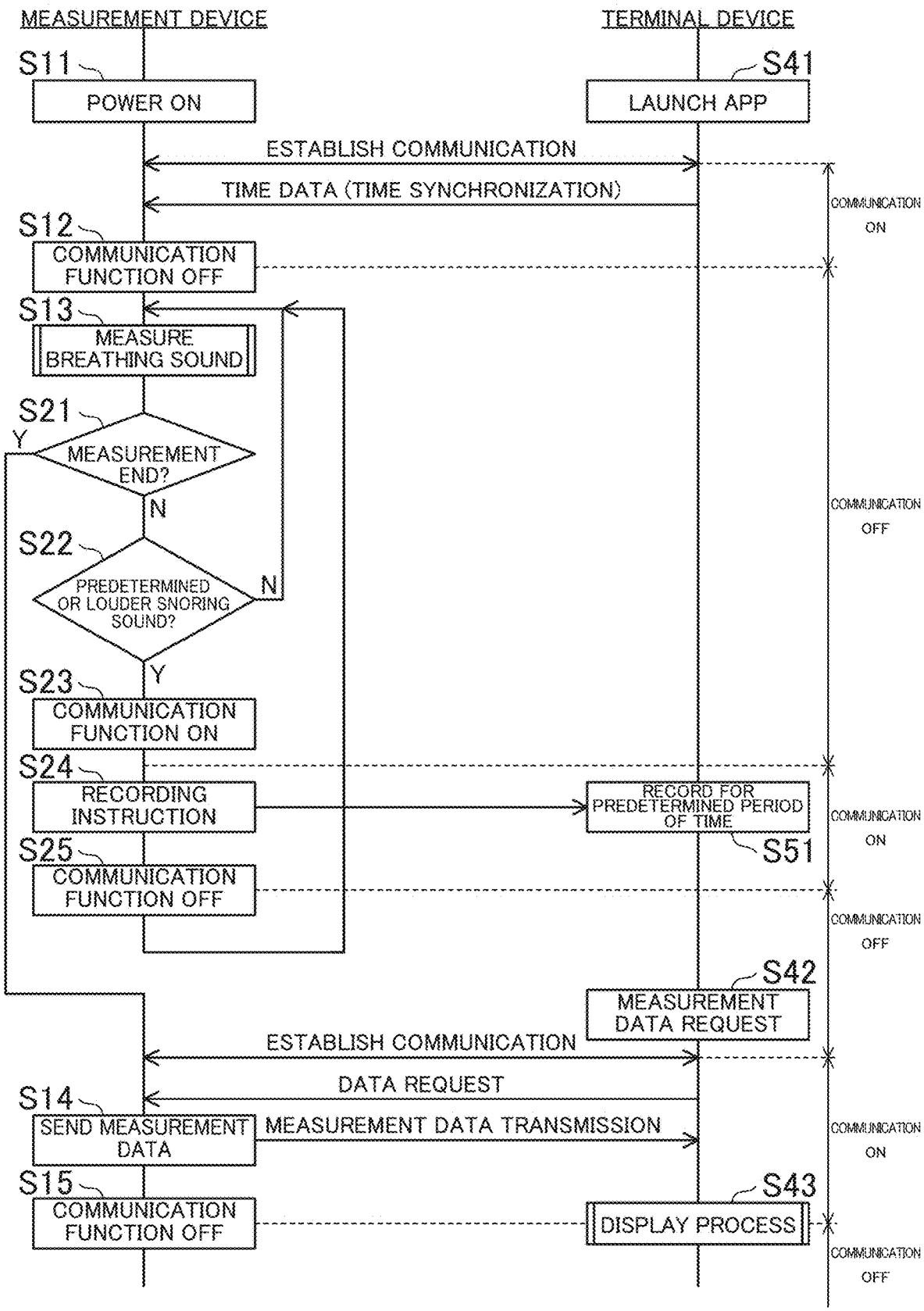
FIG. 18 is a flow chart showing another example of an operation of the sleeping state measurement system.

FIGS. 18 and 19 each show an operation of the sleeping state measurement system including a function of recording snoring sound. The sleeping state measurement system may be configured in the same manner as the foregoing embodiments. It should be noted that steps in the control flows in FIGS. 18 and 19 that are identical to those in FIG. 14 are given the same signs. The following description is given with a focus on differences from FIG. 14 and may omit to describe a common control flow.

<<Process of Recording Snoring (1)>>

In the example shown in FIG. 18, while the breathing sound measurement device 1 is measuring breathing sound in step S13 (NO in step S21), the control section 57 determines whether a predetermined or louder snoring sound has been detected (step S22). In the absence of the occurrence of a predetermined or louder snoring sound, the measurement of the breathing sound in step S13 continues.

On the other hand, in a case where a predetermined or louder snoring sound has been detected (YES in step S22), the breathing sound measurement device 1 turns on the communication function of the communication module 56 and sends a recording instruction to the terminal device 80 (step S24). In the meantime, the measuring operation of step S13 continues.

In step S51, the control section 92 of the terminal device 80, which has received the recording instruction, saves, in the storage section 91, snoring sound data recorded via the microphone 82. The terminal device 80 records snoring sound data for a predetermined period of time (e.g. approximately several minutes). The snoring sound data is associated, for example, with a line graph of the graph screen so that by tapping an area on the bar graph, the subject can listen to a portion of recording data corresponding to the area.

Upon completion of the recording instruction in step S24, the breathing sound measurement device 1 turns off the communication function, and the control flow returns to step S13. The breathing sound measurement device 1 may be provided with a recording function so that recording data may be sent together at the time of measurement data transmission in step S14.

<<Process of Recording Snoring (2)>>

In the example shown in FIG. 19, the terminal device 80 records breathing sound of the subject during sleep after the sleeping state measurement app has been launched. Specifically, for example, in step 61, which follows the launching of the sleeping state measurement app in step S41, the terminal device 80 displays, on the screen of the sleeping state measurement app, an icon that is used to start recording. Then, the terminal device 80 may start recording in accordance with the subject's operation of tapping the icon. Further, even without the subject's operation, recording may be automatically started after a predetermined period of time has elapsed since the sleeping state measurement app was launched. Alternatively, recording may be automatically started at a predetermined point in time (including a timer setting configured by the subject).

The process of step S42 is identical to that of FIG. 14. For example, when the subject depresses the data acquisition button 823 in the morning, the terminal device 80 executes a process of acquiring measurement data.

In next step S62, upon completion of the acquisition of the measurement data, the terminal device 80 associates the measurement data thus received and recording data of the terminal device 80. Specifically, since the breathing sound measurement device 1 and the terminal device 80 are synchronized with each other, they associate each other's data on the basis of the time of acquisition of each other's data.

In next step S63, the terminal device 80 edits the recording data. For example, the terminal device 80 leaves a portion of the recording data pertaining to a snoring area where a determination of snoring was made and erases the rest of the recording data. Further, for example, a predetermined or higher volume level of snoring may be left as recording data. Further, sound of an apneic area where a determination of apnea was made may be left. As to what sound to leave, the settings may be automatically configured on the basis of the settings installed in advance in the terminal device 80, or may be configured by the subject. Performing such an editing task as to leave a particular sound makes it possible to save a storage area in the storage section 91 that is used by the terminal device 80. It should be noted that the process of step S63 may not be executed. This allows the subject to hear the sleep-breath sound together with ambient sound during sleep and understand in detail a correlation between the sleeping state and the surrounding environmental state.

The display process of next step S43 is similar to that of the aforementioned embodiment. For example, as shown in FIG. 15E, a speaker icon 836 may be displayed in a place on the graph screen that corresponds to a graph, and snoring sound recorded at a point in time corresponding to a place where the speaker icon 836 has been tapped may be reproduced.

<<Process of Setting Vibrator into Non-Operating State>>

In an operation of configuring the settings for the terminal device 80, the settings may be configured such that the subject can set a vibration suspension mode in which to cause the vibrator to stop vibrating for a predetermined period of time until a predetermined period of time elapses from the start of measurement of breathing sound. In the breathing sound measurement device 1, even in a case where the vibration suspension mode is being set, the operation of the vibrator in response to snoring or apnea is stopped for a predetermined period of time after the start of measurement. For example, if the vibrator operates immediately after the subject has fallen asleep, it may interfere with sleep. Making it possible to set such a non-operating time for the vibrator 50 makes it possible to prevent the subject from keeping himself/herself from falling asleep.

Further, in each of the foregoing embodiments, the shape of the neckband 10 is not limited a substantially C shape. The neckband 10 needs only be configured to be worn on the neck of the subject so that breathing sound of the subject's neck can be measured by the microphone 52. For example, a neckband formed of a soft material such as vinyl or fiber may be wound around the neck and configured to be locked by a locking part such as a hook-and-loop fastener or an adjuster buckle.

Further, although, in each of the foregoing embodiments, the control section 92 of the terminal device 80 computes a sleeping state, a similar computation may be carried out by the breathing sound measurement device 1, and a result of the computation may be sent to the terminal device 80.

Further, although, in FIGS. 18 and 19, the terminal device 80 executes recording, the breathing sound measurement device 1 may execute recording. In this case, the microphone 52 of the breathing sound measurement device 1 acquires recording data, and the recording data is sent to the terminal device 80 together with measurement data.

Further, although, in each of the foregoing embodiments, the breathing sound measurement device 1 is of a neckband type, this is not intended to impose any limitation. Although not illustrated, the breathing sound measurement device 1 may for example be a patch-type device configured to be applied to the neck or chest of the subject to measure breathing sound. The patch-type breathing sound measurement device includes, for example, a patch pad serving as wearing means and breathing sound measurement means configured to measure breathing sound transmitted from the patch pad. It should be noted that the patch pad and the breathing sound measurement means can employ well-known configurations. Further, the breathing sound measurement device 1 may be a band-type device that is wound around the chest of the subject for use. The band-type breathing sound measurement device includes a band, equivalent to wearing means, that is wound around the chest and breathing sound measurement means, attached to the wearing means, that measures breathing sound of the subject. Moreover, even in such a case where the breathing sound measurement device 1 is different in form or configuration, the exchange between the breathing sound measurement device 1 and the terminal device 80, the method of display on the terminal device 80, or other methods can employ forms and methods that are similar to those of the foregoing embodiments, and can bring about similar effects.

INDUSTRIAL APPLICABILITY

The present invention is useful as a sleeping state measurement system configured to measure a sleeping state on the basis of breathing sound during a subject's sleep primarily at home or other places.

REFERENCE SIGNS LIST

1 Breathing sound measurement device
10 Neckband (wearing means)
50 Vibrator
80 Terminal device
81 Touch panel (display means)
84 Communication module (communication means)
92 Control section (computing means)
82 Microphone

The invention claimed is:

1. A sleeping state measurement system comprising:
a breathing sound measurement device; and
a terminal device comprising one or more of a smartphone and a tablet computer,
the breathing sound measurement device comprising:
a measurement section configured to acquire breathing sound of a subject with a contact section brought into contact with a skin of a front neck of the subject, wherein the measurement section includes a first substrate to which a microphone is attached;
a wearing section extending in a circular arc shape along an outer circumference of a subject's neck to a rear neck opposite the front neck of the subject;
a hinge section that couples a base end of the measurement section and a base end of the wearing section to each other; and
a vibrator configured to impart vibration to the subject's neck,
wherein the hinge section includes: a rotating shaft portion configured to circumferentially rotatably support the measurement section and the wearing section; and a biasing portion configured to bias the measurement section and the wearing section in a closing direction so that the subject's neck is held from outside when the breathing sound measurement device is worn on the subject's neck,
the terminal device includes: a communication module configured to communicate with the breathing sound measurement device; and a display screen,
the terminal device receives a measurement result from the breathing sound measurement device and displays information on the subject's snoring period, normal breathing period, and apneic period in at least either graph or numerical form on the display screen on the basis of the measurement result thus received, and
the terminal device displays, on the display screen, a juxtaposition of first sleep information including information on the subject's snoring period, normal breathing period, and apneic period in a vibration mode in which the vibrator is caused to vibrate and second sleep information including information on the subject's snoring period, normal breathing period, and apneic period in a non-vibration mode in which the vibrator is prohibited from vibrating.

2. The sleeping state measurement system according to claim 1, wherein,
in the vibration mode, the vibrator is configured to vibrate during at least either the subject's snoring period or apneic period and is configured to not vibrate for a predetermined period of time in response to the sleeping state measurement system beginning to measure a sleeping state of the subject.

3. A sleeping state measurement system comprising:
a breathing sound measurement device; and
a terminal device comprising one or more of a smartphone and a tablet computer,
the breathing sound measurement device comprising:
a measurement section configured to acquire breathing sound of a subject with a contact section brought into contact with a skin of a front neck of the subject, wherein the measurement section includes a first substrate to which a microphone is attached;
a wearing section extending in a circular arc shape along an outer circumference of a subject's neck to a rear neck opposite the front neck of the subject;
a hinge section that couples a base end of the measurement section and a base end of the wearing section to each other; and
a vibrator configured to impart vibration to the subject's neck,
wherein the terminal device includes: a communication module configured to communicate with the breathing sound measurement device; and a display screen,
the terminal device receives a measurement result from the breathing sound measurement device and displays information on the subject's snoring period, normal breathing period, and apneic period in at least either graph or numerical form on the display screen on the basis of the measurement result thus received, and
the terminal device displays, on the display screen, a juxtaposition of first sleep information including information on the subject's snoring period, normal breathing period, and apneic period in a vibration mode in which the vibrator is caused to vibrate and second sleep information including information on the subject's snoring period, normal breathing period, and apneic period in a non-vibration mode in which the vibrator is prohibited from vibrating.

4. The sleeping state measurement system according to claim 3, wherein,
in the vibration mode, the vibrator is configured to vibrate during at least either the subject's snoring period or apneic period and is configured to not vibrate for a predetermined period of time in response to the sleeping state measurement system beginning to measure a sleeping state of the subject.

* * * * *